(12) United States Patent
Bernhardy et al.

(10) Patent No.: US 10,956,448 B2
(45) Date of Patent: *Mar. 23, 2021

(54) SYSTEMS, METHODS, AND APPARATUS FOR HIERARCHICAL DATABASE

(71) Applicant: HarperDB, Inc., Loveland, CO (US)

(72) Inventors: Kyle Bernhardy, Denver, CO (US); Zachary Fowler, Denver, CO (US); Stephen Goldberg, Loveland, CO (US)

(73) Assignee: HARPERDB, INC., Loveland, CO (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/233,201

(22) Filed: Dec. 27, 2018

(65) Prior Publication Data

US 2019/0129900 A1    May 2, 2019

Related U.S. Application Data

(63) Continuation of application No. 15/993,538, filed on May 30, 2018, now Pat. No. 10,216,823.

(60) Provisional application No. 62/513,381, filed on May 31, 2017.

(51) Int. Cl.
*G06F 16/28* (2019.01)
*G06F 16/21* (2019.01)
*G06F 16/23* (2019.01)
*G06F 16/901* (2019.01)

(52) U.S. Cl.
CPC .......... *G06F 16/282* (2019.01); *G06F 16/213* (2019.01); *G06F 16/2365* (2019.01); *G06F 16/9017* (2019.01)

(58) Field of Classification Search
CPC .. G06F 16/282; G06F 16/9017; G06F 16/213; G06F 16/2365
USPC ........................................ 707/790, 802, 803
See application file for complete search history.

(56) References Cited

U.S. PATENT DOCUMENTS

| | | | |
|---|---|---|---|
| 6,356,913 B1 * | 3/2002 | Chu | ...................... G06F 16/212 |
| 6,965,903 B1 * | 11/2005 | Agarwal | ............... G06F 16/284 |
| 8,732,213 B2 | 5/2014 | Sowell et al. | |
| 9,104,675 B1 * | 8/2015 | Clark | ...................... G06F 16/10 |
| 9,471,711 B2 | 10/2016 | Abadi et al. | |

(Continued)

FOREIGN PATENT DOCUMENTS

WO    2014180395 A1    11/2014

OTHER PUBLICATIONS

Haffner, Ronald, "Extended European Search Report Regarding Application No. 18810145.5", dated Sep. 28, 2020, p. 11 Published in: EP.

(Continued)

*Primary Examiner* — Hares Jami
(74) *Attorney, Agent, or Firm* — Neugeboren O'Dowd PC

(57) ABSTRACT

This disclosure describes systems, methods, and apparatus for creating or updating a table in a fully-indexed hierarchical database for storing both structured and unstructured data, where the database structure rather than separate index files provides indexing. The database includes a hierarchy of nodes where the lowest nodes represent raw data and hard links to the raw data. Data records in a table, write request, update request, etc. can be exploded into attributes and values for those attributes, and then each value is stored in a separate file at the lowest nodes of the hierarchy.

19 Claims, 22 Drawing Sheets

(56) References Cited

U.S. PATENT DOCUMENTS

| | | | |
|---|---|---|---|
| 9,613,068 | B2 | 4/2017 | Tsirogiannis et al. |
| 9,614,683 | B1 | 4/2017 | Reed et al. |
| 2001/0042059 | A1* | 11/2001 | Uehara ................ G06Q 20/203 |
| 2004/0243938 | A1* | 12/2004 | Weise .................. G06F 16/748 |
| | | | 715/205 |
| 2005/0228787 | A1 | 10/2005 | Linden et al. |
| 2007/0043747 | A1* | 2/2007 | Benton .................. G06F 16/10 |
| 2008/0126397 | A1* | 5/2008 | Alexander ............ G06F 16/289 |
| 2009/0157812 | A1 | 6/2009 | Bavly et al. |
| 2010/0262631 | A1 | 10/2010 | Andersson et al. |
| 2011/0106811 | A1 | 5/2011 | Novoselsky et al. |
| 2012/0084296 | A1 | 4/2012 | Waters |
| 2012/0215768 | A1* | 8/2012 | Zellweger ............. G06F 16/284 |
| | | | 707/722 |
| 2015/0379156 | A1* | 12/2015 | Sun ....................... G06F 16/972 |
| | | | 715/234 |
| 2016/0063030 | A1 | 3/2016 | Chen et al. |
| 2016/0224594 | A1 | 8/2016 | Chow et al. |
| 2018/0081905 | A1* | 3/2018 | Kamath .................. G06F 16/23 |
| 2018/0165415 | A1* | 6/2018 | Hao ....................... G16H 50/30 |

OTHER PUBLICATIONS

Bloor, Robin, "C-Treeace: The Marriage of SQL and NOSQL", Apr. 18, 2017, Publisher: The Bloor Group, Published in: US.

Kim, Seong Woo, "International Search and Written Opinion Regarding PCT/US2018/035288", dated Sep. 12, 2018, p. 10 Published in: WO.

\* cited by examiner (PRIOR DRT)

SYSTEMS, METHODS, AND APPARATUS FOR HIERARCHICAL DATABASE

CLAIM OF PRIORITY UNDER 35 U.S.C. § 119

The present Application for Patent is a continuation of U.S. patent application Ser. No. 15/993,538, entitled "SYSTEMS, METHODS, AND APPARATUS FOR HIERARCHICAL DATABASE," filed May 30, 2018, which claims priority to U.S. Provisional Patent Application No. 62/513,381, entitled "SYSTEMS, METHODS, AND APPARATUS FOR HIERARCHICAL DATABASE," filed May 31, 2017, and assigned to the assignee hereof and hereby expressly incorporated by reference herein.

FIELD OF THE DISCLOSURE

The present disclosure relates generally to a new type of database. More specifically, but without limitation, the present disclosure relates to a database structure that inherently indexes without compromising write speed by using a hierarchy of attributes and hashed cell values.

DESCRIPTION OF RELATED ART

Indexing is a feature common to all databases and is used to facilitate searching. However, while adding one or more indexes to a database enhances searching, it also increases the write time, and thus indexing creates a tradeoff between latency on write or search/query.

To understand this more fully, we begin with an overview of indexing. To start, we will make an analogy of a database to a book. In this analogy a book also could have an index or table of contents, which allows a reader to quickly go to a page of the book that has a certain word, phrase or topic. Without this index, or table of contents, a reader would need to search the entire book in order to find every page that matches what the reader wants to know. This is very time consuming and inefficient. A database operates in a similar manner; without an index, the system loads every record (e.g., row) into memory in order to verify which record, if any, fulfill the criteria specified in a search/query. Much like a book's index, where an entry in the index points to a specific page, a database index points to a specific record for each entry in the index.

Many databases have at least one index, which is on a "primary key" or "unique identifier" or "hash value id." An example of a unique identifier is a Social Security Number, where each US citizen has their own Social Security Number, which allows citizens to be identified without any other information. Having an index on just the unique identifier allows for fast retrieval of data based on just that key. Look at the following data where a Social Security Number (SSN) acts as the index:

| SSN | FirstName | LastName |
| --- | --- | --- |
| 123456 | Jerry | Jerryson |
| 654321 | Penny | Philopson |
| 987654 | Jerry | Philopson |
| 19823 | Penny | Jerryson |
| 458754 | Kato | Pot |

To retrieve the record where SSN=654321, the database accesses the SSN index, finds the entry for 654321, and accesses the row it is connected to. Similarly, the data can be searched using multiple SSN's and the database will utilize that index to return the proper rows. Accessing information using a specific ID is useful, but many times one wants to perform broader searches, such as based on a FirstName. The above table does not include an index for FirstName, and so, accessing the records where FirstName=Jerry means that the database cannot quickly find the matching records. Instead it loads every record and checks the FirstName value and stores those that have Jerry and discards the rest. When there are millions of records this becomes very slow. Assuming that the data will often be searched based on the field FirstName, the database may be modified to include an index for this commonly-searched field. With an index for FirstName, the database is now managing an indexed list for SSN and a separate index list for FirstName (i.e., two indexes). This adds extra overhead for the database because both indexes need to be managed, as well as the two separate pointers to the corresponding rows, and changes to these indexes and pointers need to also be maintained when new data is written or deleted from the database. The more indexes that are added, the more management and storage is needed. As such, most databases are not fully-indexed; only those fields that are commonly searched are indexed. While this works for many situations, it also means that less-common queries can be slow since they are directed to non-indexed fields. It also means that compromise has to be struck between index management overhead and the speed of queries.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a fully-indexed hierarchical database for storing both structured and unstructured data, where the database structure rather than separate index files provides indexing. The database can include an HTTP/TCP server and a non-transitory, tangible computer readable storage medium, encoded with processor readable instructions for creating or updating a table in the fully-indexed hierarchical database. The server can be configured to receive a request from a client to write data records to a hierarchical database representing a table having rows and attributes. The method can include exploding the data records into attributes and values, where each of the values corresponds to one of the attributes and one of the records. The method can further include writing raw data nodes under a table node. The raw data nodes can include a raw data file for each of the values, the raw data files being children of raw data attribute nodes, the raw data attribute nodes being children of a raw data node, the raw data node being a child of the table node. The method can further include writing hard link nodes under the table node. The hard link nodes can include a hard link file for each of the values, the hard link files containing hard links to corresponding ones of the raw data files, the hard link files being children of value nodes corresponding to the values, the value nodes being children of hard link attribute nodes, the hard link attribute nodes being children of the table node.

Other embodiments of the disclosure may also be characterized as a method for creating or updating a table in a fully-indexed hierarchical database for storing both structured and unstructured data, where the database structure rather than separate index files provides indexing. The method can include receiving a request to write data records to a hierarchical database representing a table having rows and attributes. The method can further include exploding the data records into attributes and values, where each of the values corresponds to one of the attributes and one of the records. The method can yet further include writing raw data nodes under a table node. The raw data nodes can include a raw data file for each of the values, the raw data files being children of raw data attribute nodes, the raw data attribute nodes being children of a raw data node, the raw data node being a child of the table node. The method can yet further include writing hard link nodes under the table node. The hard link nodes can include a hard link file for each of the values, the hard link files containing hard links to corresponding ones of the raw data files, the hard link files being children of value nodes corresponding to the values, the value nodes being children of hard link attribute nodes, the hard link attribute nodes being children of the table node.

Other embodiments of the disclosure can be characterized as a non-transitory, tangible computer readable storage medium, encoded with processor readable instructions to perform a method for creating or updating a table in a fully-indexed hierarchical database for storing both structured and unstructured data. The method can include receiving a request to write data records to a hierarchical database representing a table having rows and attributes. The method can further include exploding the data records into attributes and values, where each of the values corresponds to one of the attributes and one of the records. The method can yet further include writing raw data nodes under a table node. The raw data nodes can include a raw data file for each of the values, the raw data files being children of raw data attribute nodes, the raw data attribute nodes being children of a raw data node, the raw data node being a child of the table node. The method can yet further include writing hard link nodes under the table node. The hard link nodes can include a hard link file for each of the values, the hard link files containing hard links to corresponding ones of the raw data files, the hard link files being children of value nodes corresponding to the values, the value nodes being children of hard link attribute nodes, the hard link attribute nodes being children of the table node.

Yet other embodiments of the disclosure can be characterized as a system including an HTTP/TCP server, an evaluator, a SQL interpreter, a SQL abstract syntax tree processor, a standard operation object processor, a standard operation object processor, a standard operation module, and an attribute evaluator. The HTTP/TCP server can be configured to receive a client request, the client request being a NoSQL or SQL object. The evaluator can be coupled to the HTTP/TCP server and can be configured to determine if the client request is in SQL or NoSQL. The SQL interpreter can have the SQL abstract syntax tree processor and the standard operation object processor. The SQL abstract syntax tree processor can be configured to receive the client request from the evaluator when the client request is a SQL object. The standard operation object processor can be coupled to the SQL abstract syntax tree processor and can be configured to generate a NoSQL object from any SQL object received at the SQL abstract syntax tree processor. The standard operations module can include an insert module, an update module, a delete module, a create schema/table module, and a search module. The attribute evaluator can be coupled between the evaluator and the SQL interpreter and the standard operations module and can be configured to route NoSQL objects to a proper one of the modules of the standard operations module. Operations of the standard operations module can be carried out on the fully-indexed data schema, and the data schema may not use memory to store an index file.

Other embodiments of the disclosure can be characterized as a system comprising a minimum a central processing unit of supported architecture and operating system (e.g., Unix-based) for which Node.js can be compiled to binaries alongside said operating system, persistent storage device not limited to a single solid-state drive, non-volatile PCIe or an array of said devices, a network device for world internet communication and/or local intranet communication. In one common configuration a random access memory device and/or an array of the above device, when non-volatile PCIe devices are not being utilized, to provide non-persistent memory access.

The above minimum prerequisites allow the HarperDB database to function as a receiver from a local and/or remote client; a client also provided the above minimum prerequisites, and a respondent to requests from local and/or remote clients. Clients of the HarperDB database are not specific to HarperDB and these clients utilize a standard in the industry known as the hypertext transfer protocol (HTTP) which utilizes another industry standard layer referenced by Transmission Control Protocol (TCP). The HarperDB database server allocates CPU cores threads, non-volatile and/or random access memory device's storage partitions and network interfaces into efficient modules. HarperDB server's use CPU core threads for parallel processing when receiving and responding to client requests. The unique allocation of persistent storage creates one layer of inherent indexing providing faster look up times for HarperDB client inserted/updated attributes as well as a simpler allocation method for volatile and properly allocated non-volatile memory devices, wherein competitors offering a multi-model method responding to clients requests, require a separate random access memory allocation to do transformations for requests that are not part of their primary persistent storage allocation method. HarperDB's unique persistent storage allocation provides random access memory the same allocation for responding to transactions of, but not limited, to current supported models, i.e., SQL, NoSQL, CSV, through what has been termed a single model method.

Furthermore, while structured data (e.g., tabulated data having common formats) has long been a mainstay of databases, today's Internet of Things, voice recognition, and wider and wider integration of disparate systems, among other causes, is leading to large amounts of unstructured data. Unstructured data does not have a pre-defined data model or is not organized in a pre-defined manner. Unstructured information is typically text-heavy, but may contain data such as dates, numbers, and facts as well. This results in irregularities and ambiguities that make it difficult to understand using traditional programs as compared to data stored in fielded form in databases or annotated (semantically tagged) in documents. While database queries to structured data are straightforward, organizing and querying unstructured data, and/or querying databases having both structured and unstructured data, is a common challenge. For the purposes of this disclosure, structured data will include any data that can be effectively queried via a Structured Query Language (SQL), and unstructured data will include all other forms of data.

Some database management platforms have the ability to handle both structured and unstructured data (e.g., COUCHBASE, MONGODB, ORACLE DATABASE, ORIENTDB, and DATASTAX). Yet, these database systems handle unstructured data and requests by transforming them into a structured form. And this transformation generates overhead in that the raw data and the transformed data are both stored, leading to storage duplication. Couchbase is also known as a multi-model.

This disclose will commonly refer to NoSQL and SQL objects, but it should be understood that any unstructured data or object can be substituted for the herein disclosed NoSQL objects.

NoSQL (e.g., JSON format of NoSQL protocol) and SQL are two common database protocols, each with their own advantages and disadvantages. A typical database 102 (see FIG. 1) includes a data schema 104 and an interpreter 106. The database 102 can receive database operations 108 from a user (e.g., queries and instructions to modify the database 102). As noted above, COUCHBASE is a database management platform that can work with user applications written in either NoSQL or SQL. To accomplish this, COUCHBASE operates primarily in NoSQL (i.e., it has a NoSQL datastore), but includes interpreters for NoSQL and SQL. NoSQL queries and database manipulations are passed to the NoSQL datastore without transformation, while SQL queries and database manipulations are converted to NoSQL before being passed to the datastore. Results of SQL queries are transformed from NoSQL to SQL in memory (e.g., random access memory or RAM) en route back to a client side or a SQL application interface. Thus, even though COUCHBASE enables NoSQL and SQL interaction with a single datastore, the datastore itself uses a single traditional protocol—NoSQL.

FIG. 2 illustrates a possible implementation of a COUCHBASE database. The database 202 includes a NoSQL data schema 204 and an interpreter 206, 210 for each of the two data formats that the database 202 can interact with. Regardless of the data format that a client is using, interactions with the data schema 204 are always converted to or from NoSQL, and thus we can say that the data schema is of a single traditional type.

As shown, traditional database management systems struggle with the overhead of increased indexing and also generate undue overhead when trying to handle both structured and unstructured data. The need to manually create new indexes is also taxing on database administrators in traditional systems.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

The present disclosure relates generally to databases. More specifically, but without limitation, the present disclosure relates to a database structure including a hierarchy of attributes and hashed cell values for the database that achieves full indexing without storing an index in memory.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 1:
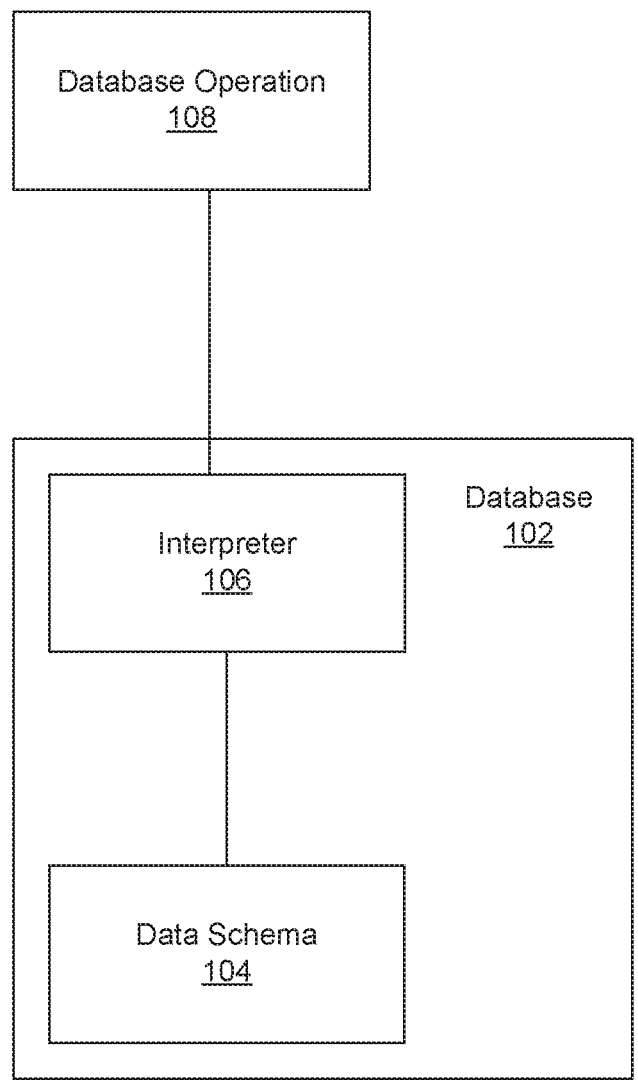
FIG. 1 illustrates a typical database system.
Figure 2:
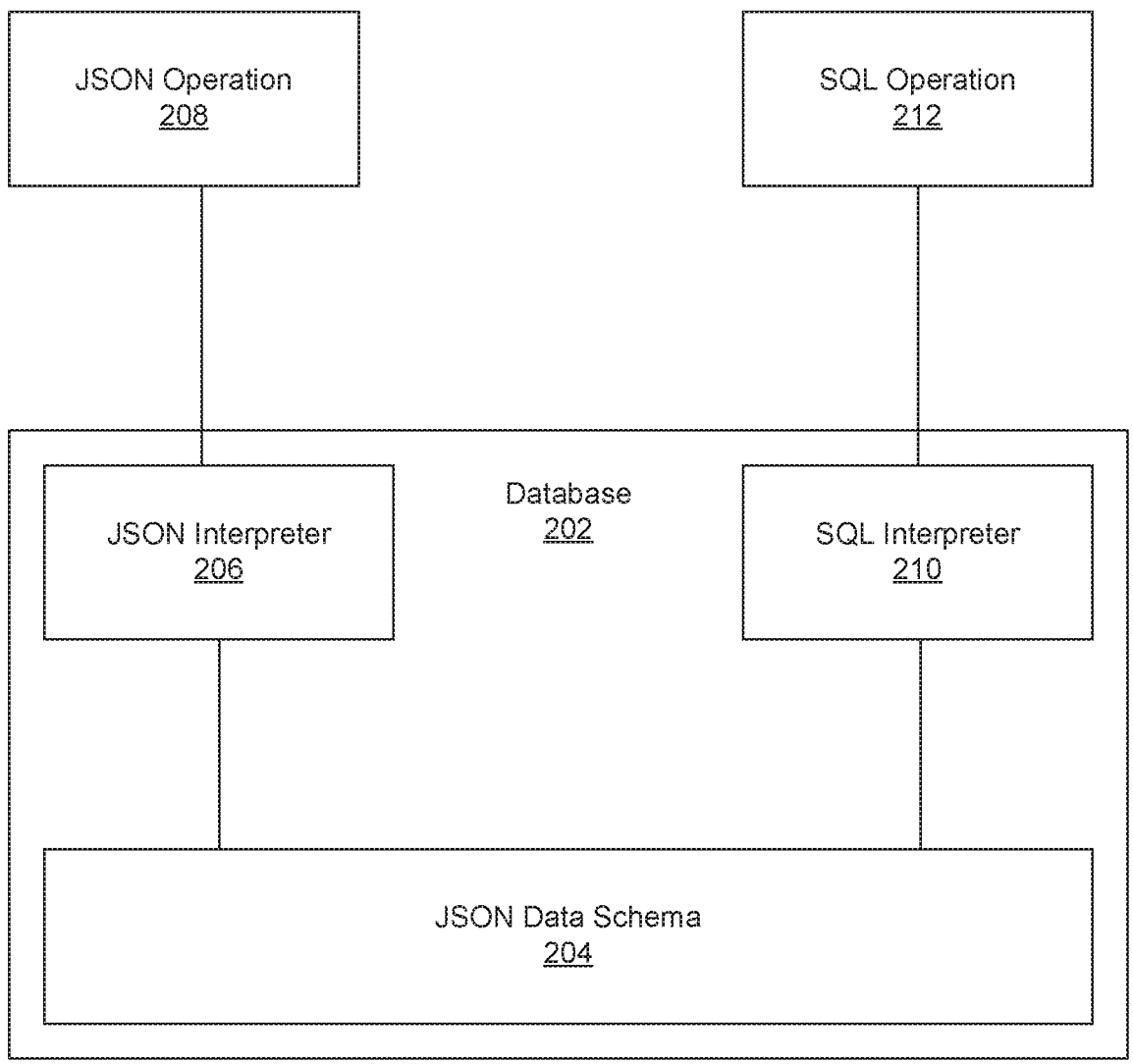
FIG. 2 illustrates a possible implementation of a COUCHBASE database.

Traditional industry standard databases (e.g., relational, document, columnar, FIG. 1) perform Create, Read, Update, Delete (CRUD operations) and index management in separate processes. Index management is an ongoing process, and traditional databases manage the index files differently with respect to when and how many resources are available to update the individual index references. Depending on which attributes a user decides to index, these files can be large and many.

CRUD operation processes typically append data to a file, traverse the file(s) for updates, traverse the file(s) for searching, and traverse the file(s) for delete. Indexing helps manage traversing and search, but only for indexed attributes, and the use of indexes uses more temporary storage (e.g., RAM) during runtime. Thus, to implement traditional indexed database on various server types often necessitates codebase refactoring, creating management complexity between edge computing, big data and traditional database environments.

The herein disclosed HarperDB uses a unique hierarchical approach that eliminates the need to load full records into temporary memory, as well as removes the need to manage indexes (e.g., index reference files). The hierarchical model inherently indexes attributes and the unique identifier index table (e.g., _hdb_hash), not only stores the raw data (e.g., .hdb files in FIG. 9 and value files in FIG. 10), but also supports BTREE traversal for getting the file by its unique identifier. Reducing resource consuming processes, HarperDB can be implemented on all device/server types without limiting features. For example, internet of things (IoT) devices with limited memory and processing resources as well as supercomputers, both run the same code base, reducing distributed data complexities.

Definitions

For the purposes of this disclosure, a hard link is the file system representation of a file by which more than one path references a single file in the same volume. The term "hard link" is usually only used in file systems that allow more than one hard link for the same file. Creating a hard link has the effect of giving one file multiple names (e.g. different names in different directories) all of which independently connect, or link, to the same data on the disk, and none of which depends on any of the others. Any changes to a file having hard links are instantly visible to applications that access it through the hard links that reference it. However, the directory entry size and attribute information is updated only for the link through which the change was made. Note that the attributes on the file are reflected in every hard link to that file, and changes to that file's attributes propagate to all the hard links. For example, if one resets the READONLY attribute on a hard link to delete that particular hard link, and there are multiple hard links to the actual file, then one will need to reset the READONLY bit on the file from one of the remaining hard links to bring the file and all remaining hard links back to the READONLY state.

For example, in a system where C: and D: are local drives and Z: is a network drive mapped to \\fred\ share, the following references are permitted as a hard link:

```
C:\dira\ethel.txt linked to C:\dirb\dirc\lucy.txt
D:\dir1\tinker.txt to D:\dir2\dirx\bell.txt
C:\diry\bob.bak linked to C:\dir2\mina.txt
```

The following are not:

```
C:\dira linked to C:\dirb
C:\dira\ethel.txt linked to D:\dirb\lucy.txt
C:\dira\ethel.txt linked to Z:\dirb\lucy.txt
```

By contrast, a soft link or "shortcut" to a file is not a direct link to the data itself, but rather is a short file that contains the text of a file name, or a location that gives direct access to yet another file name within some directory. The name contained in or referred to by the soft link may either be a hard link or another soft link. This also creates aliasing, but in a different way.

For the purposes of this disclosure, a hybrid transaction/analytical processing database (HTAP) is a database that excels at both ingest and output. Typically, a database is created to excel at either ingest (e.g., MONGODB or DYNAMO) or output (e.g., relational databases), but is incapable of optimizing both.

The word "exemplary" is used herein to mean "serving as an example, instance, or illustration." Any embodiment described herein as "exemplary" is not necessarily to be construed as preferred or advantageous over other embodiments.

Solution

This disclosure describes a database that can interact with operations in structured and unstructured data formats (e.g., JSON, SQL, Maps, XML, CSV), and implements a novel datastore with standard operations interposed between interpreters for the different data formats and the datastore. The standard operations include, inter alia, the ability to explode or separate attributes of a data object and address these separated attributes in parallel (e.g., search each attribute via a separate CPU core thread). This novel datastore and approach includes inherent full indexing (i.e., no tradeoff between indexing and overhead), application to both structured and unstructured data without the need to store raw data and translated data, and faster read and write speeds than even minimally-indexed existing databases such as SQL Lite.

In particular, queries, table modification requests, or other database operations arrive through an HTTP REST request and/or command line interface command in NoSQL, SQL, XML, or CSV, to name a few non-limiting examples. For instance, a SQL operation may be: INSERT INTO dev.person SET id='ada-3532',first_name='Jerry', last_name='Master'. In contrast to a typical database, the herein disclosed solution, or "HarperDB," receives this data and explodes out each row in the incoming data into individual data elements assigned by attribute/column. For instance, if a request to generate a 2×2 table, or to modify all values in a 2×2 table, were received by HarperDB, this data would be exploded or separated into four elements, (e.g., first row, first attribute/column; first row, second attribute/column; second row, first attribute/column, and second row, second attribute/column). In this example, the 2×2 table would be stored in the HarperDB as four separate files. In comparison, a typical database would store the entire table as a single file. While this approach seems to increase complexity and overhead by increasing a number of files associated with a given table, the solution unexpectedly lowers storage needs (since no storage is needed for attribute indexes), decreases read and write latency, and achieves both of these while handling both structured and unstructured data operations.

Figure 7:
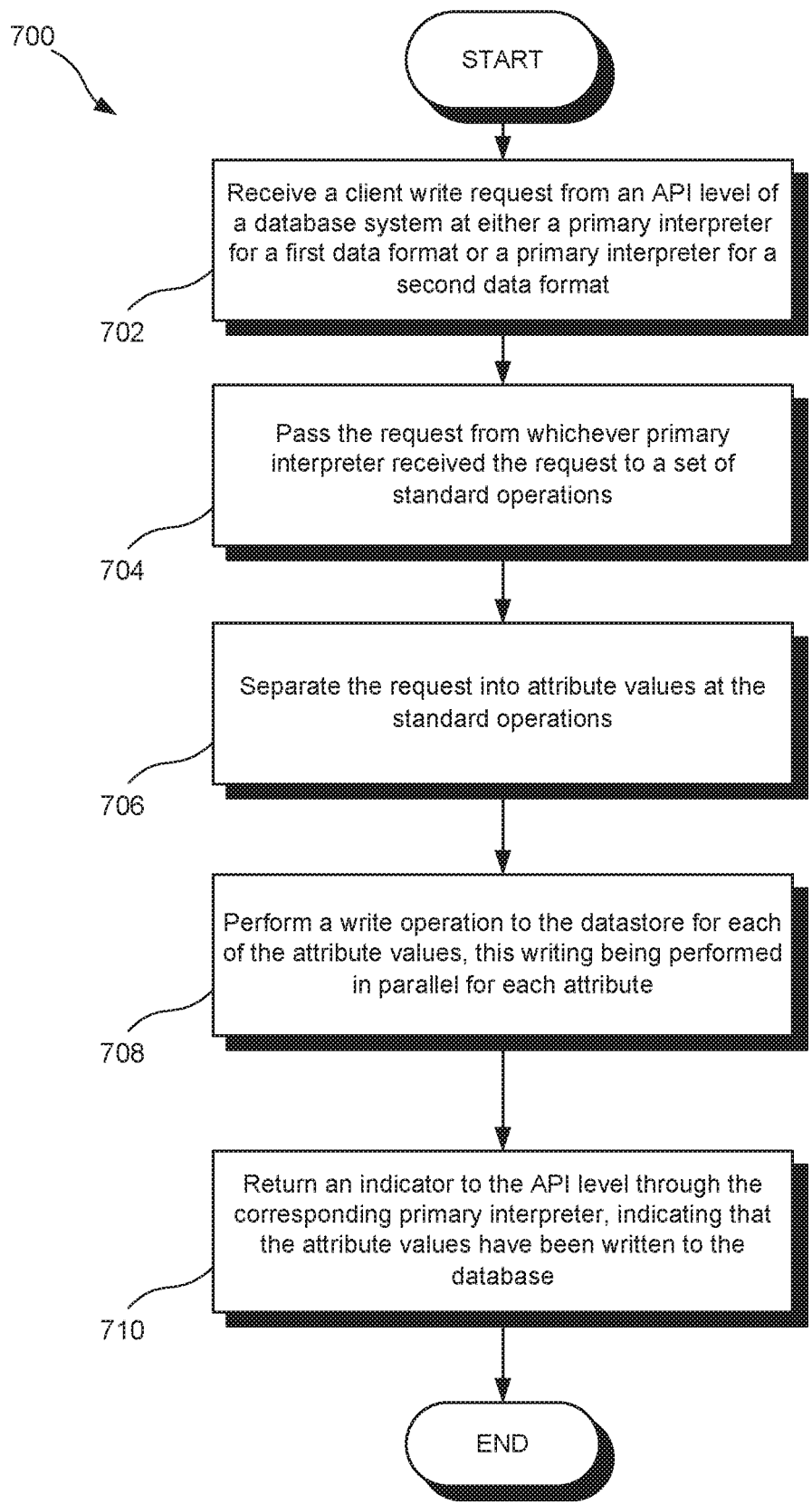
FIG. 7 illustrates one method of operating the HarperDB to respond to a write request.

Further, relationships between these files (or between the values in the table) are stored as a hierarchy of levels of storage between the separate files (e.g., see FIG. 7). For instance, a first level of storage may represent an attribute (e.g., ID, NAME, BREED), where that attribute has values for four rows (e.g., Penny, Kato, Alby, Fido), so four nodes would be stored under the attribute level of storage. The fact that these nodes constitute a sub-level of storage to the attribute level of storage indicates that they are children of that attribute without storing any further relationship information in the database; the file structure inherently indicates hierarchical relationships whereas traditional databases store separate files with metadata about such relationships (i.e., indexes). In other words, the full-indexing of the HarperDB is inherent to the file structure rather than having to be stored as a separate set of metadata. Because these relationships are inherent and not stored in separate metadata, the HarperDB uses less memory and storage space for index storage than known databases yet achieves the low latency of a fully-indexed database. Said another way, the HarperDB includes inherent indexing of every instance of data, something that existing databases can only achieve with a significant decrease in write speed (the greater the indexing the slower the write speed). Thus, the indexing inherent to the file structure allows both fast read and write speeds, whereas existing databases have to balance these two.

Figure 3:
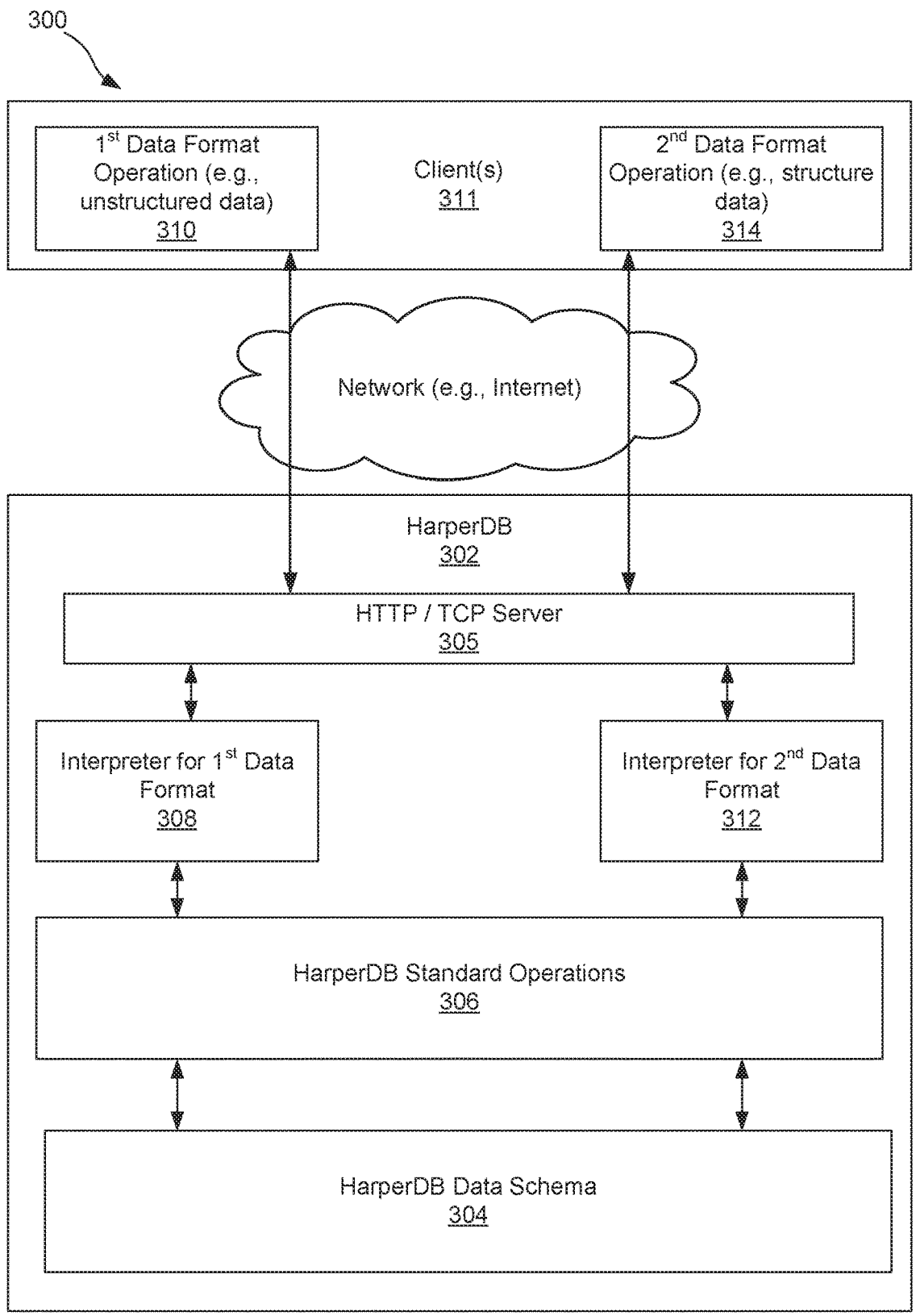
FIG. 3 illustrates a database according to one embodiment of this disclosure

FIG. 3 illustrates a database according to one embodiment of this disclosure. The database can be called a Harper Database 302 (HarperDB), and can include a HarperDB data schema 304. This data schema 304 does not use NoSQL, SQL, or any other known data format, but rather uses a hierarchy of storage levels as described throughout this disclosure. To implement such a novel data schema 304, the HarperDB 302 also includes a standard operations 306 that interacts with and acts as an intermediary between a one or more primary interpreters of the HarperDB 302. As illustrated, there are two primary interpreters 308, 312, one for a first data format (e.g., unstructured) and one for a second data format (e.g., structured). The primary interpreters 308, 312 act as intermediaries between one or more clients 311 and the standard operations 306. The one or more clients 311 can generate first and second data format operations 310, 314. In some cases, a client can make both the first and second data format operations 310, 314, while in other cases, at least one client can make the first data format operation 310 and at least one other client can make the second data format operation 314.

The one or more clients 311 can be in network communication with the HarperDB 302, and in particular to an HTTP/TCP server 305, or another network component of the HarperDB 302. The HTTP/TCP server 305 can pass operations (e.g., structured or unstructured) to a respective interpreter 308, 312, and the corresponding interpreter 308, 312 can perform one or more transformations on the operation before passing a transformed operation to the standard operations 306. The standard operations 306 then perform one or more transforms on the transformed operation 310 and again pass the operation to the HarberDB data schema 304.

It should be noted that the HarperDB 302 is not limited to two data formats or two interpreters. For instance, Graph Query Language (graphQL) and Command Line interfaces could be implemented in the future.

Figure 4:
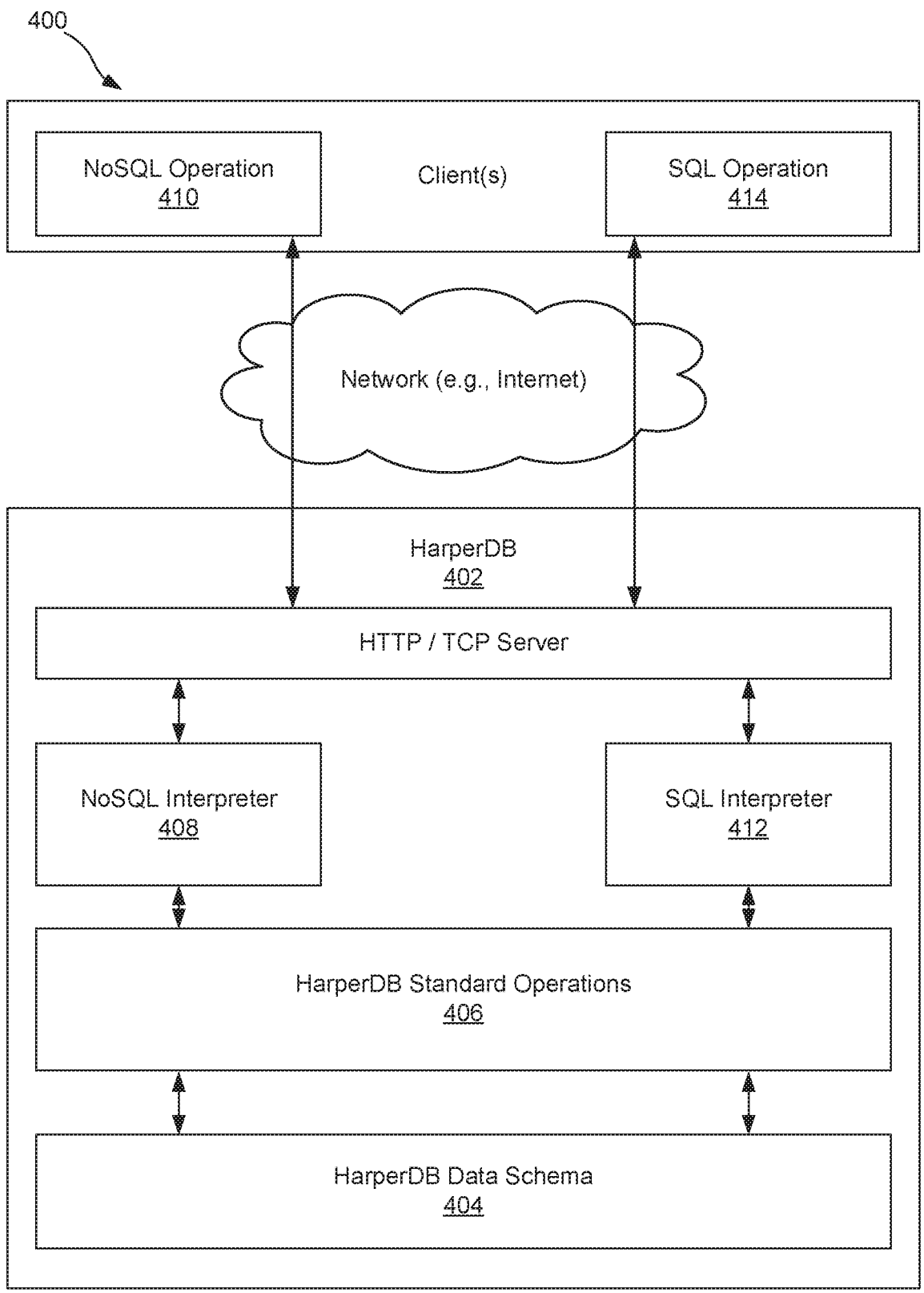
FIG. 4 illustrates another database according to another embodiment of this disclosure.

FIG. 4 illustrates another database according to another embodiment of this disclosure. Like FIG. 3, the HarperDB 402 of FIG. 4 includes a HarperDB data schema 404 and a standard operations 406. However, here, the database 402 is configured to operate with NoSQL and SQL data formats, and in particular with NoSQL operation 410 and SQL operation 414 (e.g., select, update, delete, insert, etc.). The primary interpreters 408, 412 are NoSQL and SQL-based and interact with their respective operations 410, 414.

Figure 5:
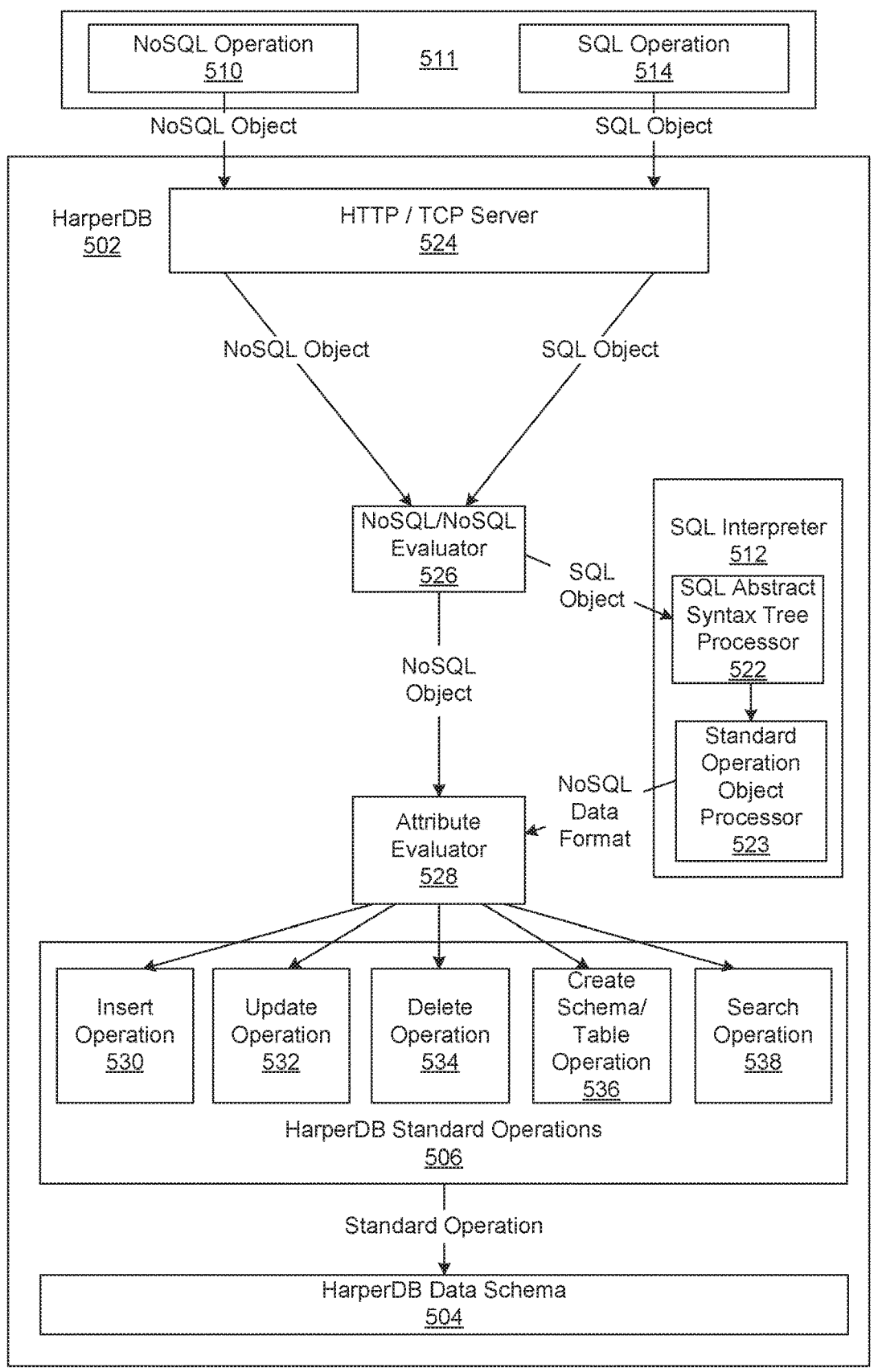
FIG. 5 illustrates a more detailed embodiment of the HarperDB.

FIG. 5 illustrates a more detailed embodiment of the HarperDB and will be described with reference to the method 600 in FIG. 6. In this embodiment, the HarperDB 502 can respond to either NoSQL operations 510 (e.g., JSON, CSV, XML) or SQL operations 514. Whereas prior art databases, such as Couchbase, use an alternative service (e.g., https://developer.couchbase.com/documentation/server/5.1/architecture/data-service-core-data-access.html (see Retrieving items Note)) to prepare SQL data for the data schema to be interacted with (e.g., NoSQL), the HarperDB data schema 504 can be directly interacted with via the standard operations 506 without a transformation for the data within the HarperDB data schema 504. It should be noted, that although this figure focuses on NoSQL and SQL objects, the HarperDB can also be implemented relative to other structured and non-structured database objects.

Each operation 510, 514 from the client 511 is sent to the HarperDB server 502 (Block 602) which can provide listening network ports for hypertext transport protocol (HTTP) which utilizes Transmission Control Protocol (TCP) 524. These operations or requests can be made via a network (e.g., the Internet) (not shown). Listening ports of the network protocols 524 can transport this data in a non-blocking asynchronous manner to a NoSQL/SQL evaluator 526. Client 511 requests sent in the SQL format 514 (Decision 606=SQL) are sent to the SQL interpreter 512 (Block 608). NoSQL requests (Decision 606=NoSQL) are passed directly to the Attribute Evaluator 528 (Block 616). For SQL objects, the SQL interpreter passes the SQL formatted data 514 through the SQL abstract syntax tree (AST) processor 522 (Block 610) which then passes its data into the standard operations object processor 523 (Block 612). The standard operations object process 523 can traverse an object to match, add, or remove key-value pairs to determine the state, or to apply state, to the object. The SQL AST processor 522 can convert the SQL object to a NoSQL object (e.g., interpret SQL requests, organize which attributes need conditions, joins, and interpreting functions (e.g., sum, average, sort), and pass this to the standard operation object processor 523, which prepares the NoSQL object for the HarperDB standard operations 506 (e.g., by filtering the syntax tree object into a standard operations object and filtering out unnecessary attributes that will not be used by subsequent processes). The result of these processes provides a NoSQL (e.g., JSON) data format, similar to the NoSQL object. Those of skill in the art appreciate that SQL provides a language that would be laborious to implement in NoSQL. So, the SQL AST processor 522 can generate a NoSQL data format that is similar, but different than a NoSQL object, namely, including alternative attributes to allow functions, joins, and conditionals that would be daunting to build by hand and could force developers to learn a new set of attributes and accompanying values. NoSQL data formats are then processed through the Attribute Evaluator 528 (Block 616) to determine which of the HarperDB standard operations 506 applies to the NoSQL object (Block 618).

The NoSQL object and the NoSQL data format both can include an "operation" attribute having values that trigger different HarperDB standard operations 532 (e.g., create table, create schema, insert, update, delete, search by hash, search by value, sql).

The appropriate standard operation 506 is then carried out on the HarperDB data schema 504 (Blocks 620, 622, 624, 626, 628). The standard operations are described in more detail in preceding figures as follows: invoke insert flow in HarperDB standard operations 530 (FIG. 13) (Block 620), invoke update flow in HarperDB standard operations 532 (FIG. 14) (Block 622), invoke delete flow in Harper DB standard operations 534 (FIG. 15) (Block 624), invoke create schema/table flow in HarperDB standard operations 536 (FIGS. 11 and 12) (Block 626), and invoke search flow in HarperDB standard operations 538 (FIG. 16) (Block 628).

While existing databases may perform some of the herein disclosed standard operations, the way in which these standard operations are carried out and interact with the HarperDB data schema 504 has not been seen before. For instance, typical standard operations involve entire rows or documents to be pulled into memory in order for standard operations to interact with this data. In contrast, the HarperDB standard operations 506 can operate on individual attributes or attribute values without loading an entire row or document into memory.

Figure 6:
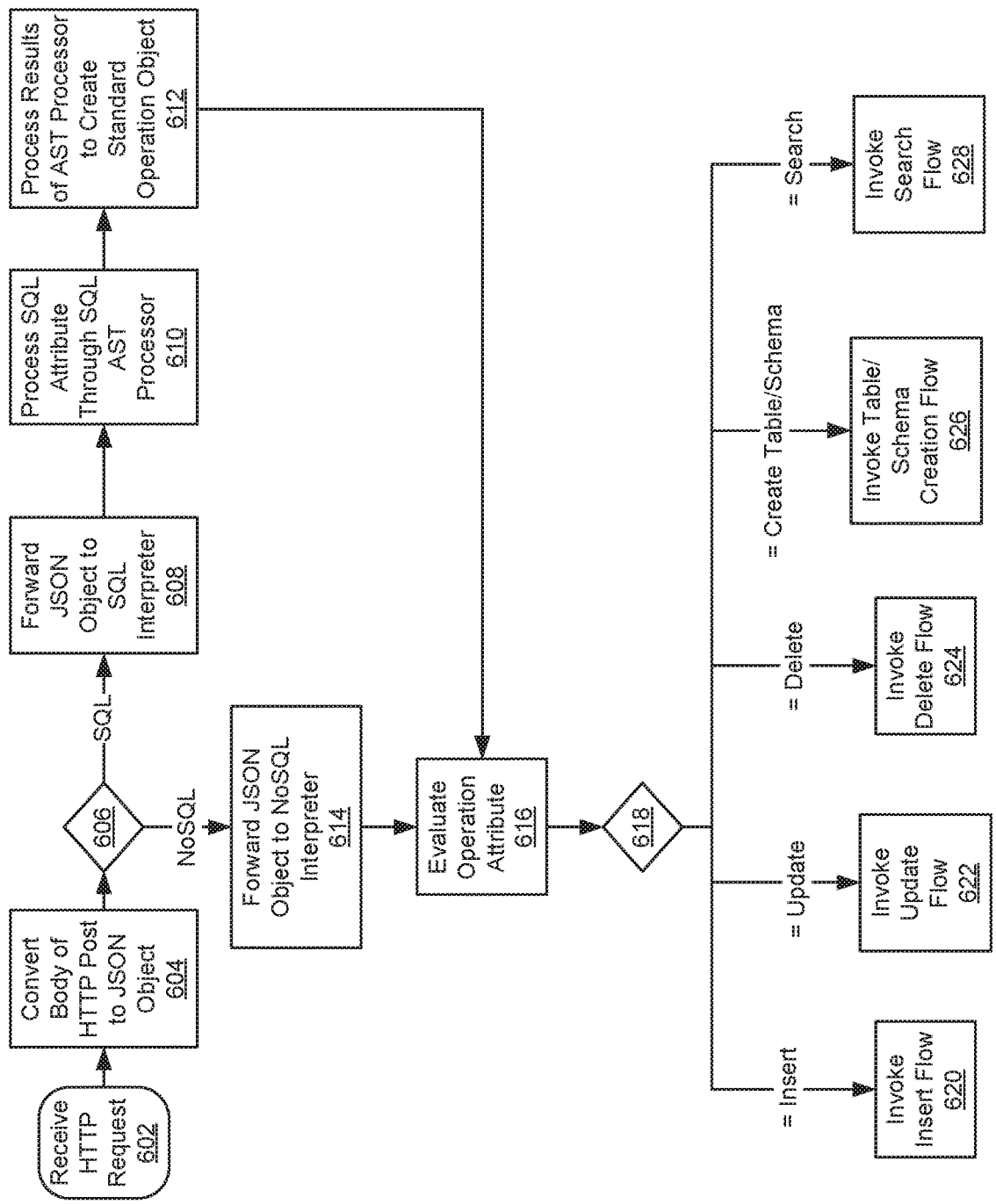
FIG. 6 illustrates a method of operating an embodiment of the HarperDB.
Figure 8:
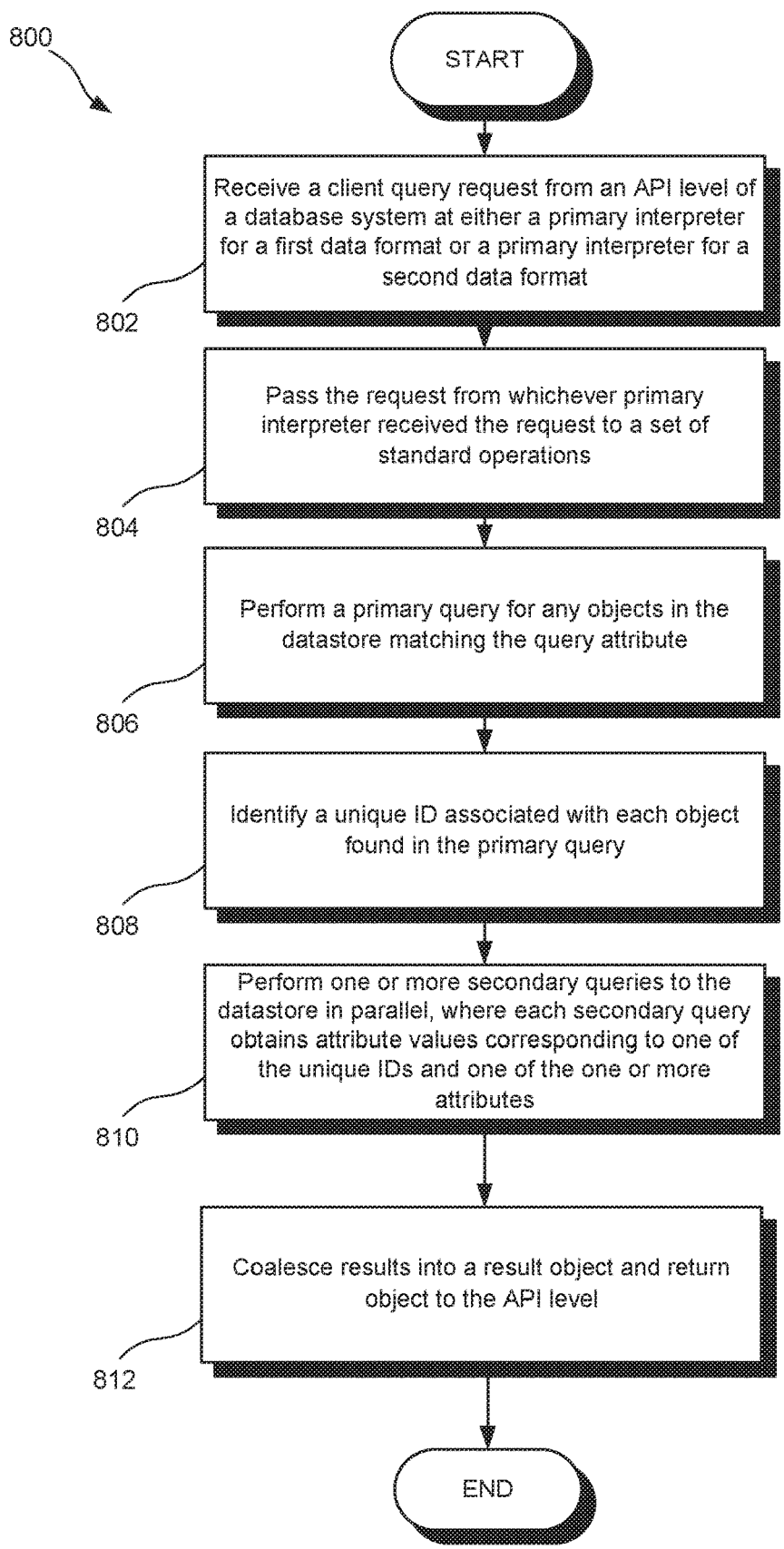
FIG. 8 illustrates one method of operating the HarperDB to respond to a query.

While FIG. 6 illustrated a general method of operating the embodiment of the HarperDB of FIG. 5, FIGS. 7 and 8 show specific methods of operating the embodiment of the HarperDB of FIG. 3. Namely, a method 700 for performing a write/update operation and a method 800 for performing a search or query.

The method 700 begins with receipt of a client write request from an API level of a database system (Block 702). This request can be received at either a primary interpreter for a first data format (e.g., NoSQL or other unstructured format) or a primary interpreter for a second data format (e.g., SQL or other structured format). The method 700 can then pass the request from either of these primary interpreters to a set of standard operations (Block 704) and separating the request into attribute values at the standard operations (Block 706). The method 700 can then perform a write operation to the HarperDB data store for each of the attribute values, and this writing can be performed in parallel for each attribute (Block 708) (e.g., each attribute value can be written in parallel using a different CPU core thread). The method 700 can then return an indicator to the API level through the corresponding primary interpreter, where the indicator indicates that the attribute values have been successfully written to the database (Block 710).

Similarly, the method 800 beings with receipt of a client request from an API level a database system for a query/search (Block 802). The request can be received at either a primary interpreter of a first data format or a primary interpreter for a second data format. The method 800 can then pass the request from either of these primary interpreters to a set of standard operations (Block 804). The method 800 can then perform the query on the HarperDB data store (Block 806) and identify a unique ID associated with each object found in the query (Block 808). ***This is done by finding a link file for the attribute value matching the query. The link file includes a hard link to a raw data file that is a child of an attribute directory that is a child of a raw data directory that is a child of a table directory. The hard link can be used to access the corresponding raw data file (Block 810). The method 800 can then coalesce these results into a result object and return the result object to the API level (Block 812).

Figure 9:
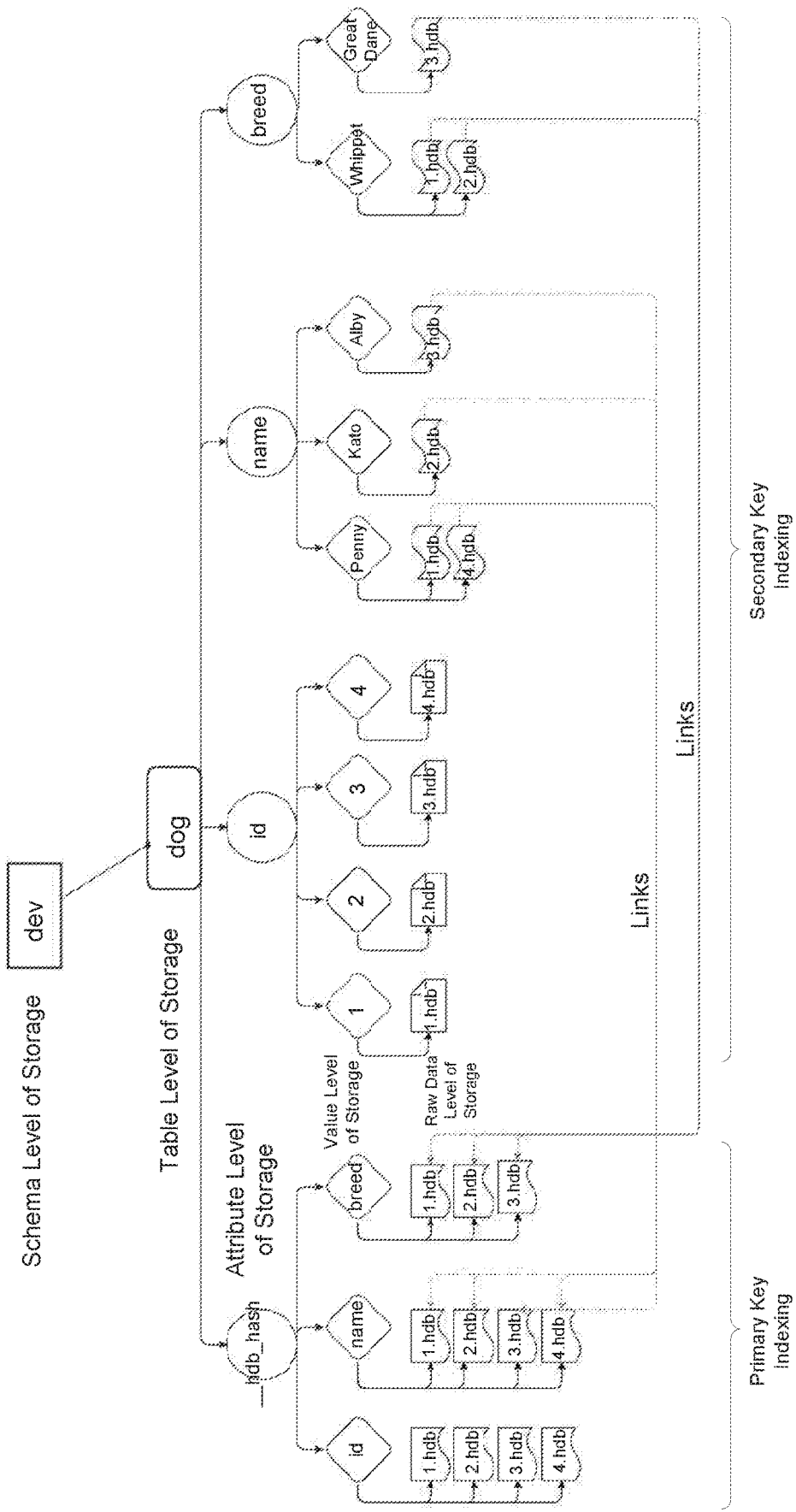
FIG. 9 illustrates a storage structure for an exemplary implementation of the HarperDB.

FIG. 9 provides a real-world example of the HarperDB and a visualization of the HarperDB data store hierarchy. In this example, the schema is named "dev" and one table under this schema is called "dog." However, any other schema or table could be used instead of "dev" and "dog." The "dog" table that FIG. 9 represents in HarperDB form is as follows:

| ID | Name | Breed |
|---|---|---|
| 1 | Penny | Whippet |
| 2 | Kato | Whippet |
| 3 | Alby | Great Dane |
| 4 | Penny | |

As a reminder, each column represents an attribute, such as ID (a unique identifier), name, or breed, and values in a column are termed values or attribute values. A row is known as a record. The ID is a unique ID used to identify records. In other words, attributes identify columns and the unique ID identifies rows.

Each element in FIG. 9 represents a level of storage or a file. All but the lowest nodes can include one or more children (i.e., they can be likened to file folders). The schema is called "dev" and constitutes the topmost level of storage. The child of the schema is "dog," or the name of the table. Children of the "dog" or table level of storage include nodes for the three attributes, "ID," "name," and "breed," and as well as a raw data node called "_hdb_hash". The "_hdb_hash" node comprises raw data for the table stored under child nodes for the three attributes in this example. For the three attribute nodes, their children include hard links to corresponding files under the raw data node (e.g., _hdb_hash). For instance, the "name" attribute node includes three children, "Penny," "Kato," and "Alby," each of these three value nodes representing one of the attribute values in the "name" column of the table. Each of these attribute value nodes includes one or more hard links (e.g., since the name "Penny" refers to two different dogs, the Penny attribute value node has two hard links contained therein). The name of each hard link file includes the unique ID or "id" of the record (or row) corresponding to the hard link. For instance, since Penny appears in ID 1 and 4, the hard link files are named "1.hdb" and "4.hdb." It should be noted, that the ".hdb" suffix is exemplary only and can include any number of other suffixes. It should also be noted, that the .hdb hard links under the id, name, and breed attribute level nodes are not raw data, but hard links, whereas the .hdb files under the _hdb_hash raw data node are raw data files. Said another way, even though these files appear to have the same names, they are not identical files.

In order to write to the database in FIG. 9, data within a write request is exploded or separated. For instance, if values for two columns and two records (or rows) are to be written to the database, then this request is exploded into four elements that are each separately (and optionally in parallel) written to the database.

To access a record, for instance, in response to a query, each record can include a unique identifier (e.g., "ID"), and this ID can be used by the HarperDB to respond to additional queries once the ID is known (e.g., returning a list of all dogs named rosemary and having an owner zach, which provides an ID and then using that ID to return vet records associated with that ID rather than performing a larger filtered search). Elements in the database are separately accessed and then unified into a single query result. For instance, a query for all dogs named Penny would result in two records being returned. The query may also specify that three attributes are to be returned: ID, name, and breed. There would therefore be three returned elements for each record for a total of six elements. The raw data for these six elements is found in six separate raw data files under _hdb_hash, whereas traditional databases would pull the two records as a single element or file.

Writing data to the database also means writing two files for every element: (1) a raw data value; and (2) a hard link. In other words, when data is written to the database, one file (the hard link) is written under the id, name, or breed attribute value nodes, or a new attribute and/or attribute value if applicable, and a second file (the raw data) is written under the _hdb_hash node. For instance, the following structure can store the raw data: <schema>/<table>/_hdb_hash/<attribute>/<unique id>.hdb (e.g., dev/dog/_hdb_hash/name/2.hdb where the raw data value is Kato). And the following structure can store the hard link: <schema>/<table>/<attribute>/<attribute value>/<unique id>.hdb (e.g., dev/dog/breed/greatdane/3.hdb where the raw data value is Great Dane). This duplicative writing may seem overly complex and high in overhead, but as will be seen in the test data at the end of this disclosure, the HarperDB solution unexpectedly lowers memory overhead and decreases read and write latency over traditional databases.

For the purposes of this disclosure, a schema name is the name of the schema that holds the tables and their child attributes and data. A table name is the name of the table or object that contains each data attribute. An attribute name is the name of each element in the table or object. An attribute value (object data value and table attribute value can be used interchangeably) is the value assigned to each attribute. A unique identifier (or ID) is the ID of the record. The unique identifier can be used as follows, and with reference to the example in FIG. 9. A query can be received as follows: Select id from dev.dog where breed=whippet. The result can return an array of id [id: 1, id: 2]. The query can then select name, breed where id=2, which returns a single object array [{name: "Kato", breed="whippet" } ].

In an embodiment, dual indexing is enabled by referencing each value in the raw data nodes (i.e., the .hdb files two levels below the _hdb_hash node). When a table is created, the client provides a unique attribute (e.g., unique identifier, hash attribute, social-security-number), which becomes a first layer of indexing. However, the remainder of the table is inherently indexed (i.e., found within the data model path structure (i.e /dev/dog/name/rosemerry/n.hdb all dogs named rosemerry are found in that directory path), without using any additional storage.

For instance, a query for the owner name of any breeds having the value "husky" could be made. The HarperDB could return a list of unique identifiers corresponding to breeds=husky, and then go to the owner attribute node (_hdb_hash/owner) and retrieve any raw data values with respect to the list of unique identifiers. The HarperDB could then combine like unique identifiers and create one or more key-value pair objects to return to the user.

Within the _hdb_hash group, the "ID" value makes it easy to get each element and thereby pull the data back together. For instance, a user can query by "ID" value. Indexing is based on value by storing the data by a value grouping underneath each attribute value group. The elements stored in these groups can be linked back to the raw data values saved in the _hdb_hash bucket (or attribute path or URL or URI) (see "Links" in FIG. 9).

The raw data values can be stored via the following structure: <Schema>\<Table Name>\_hdb_hash\<Attribute>\<unique id>.hdb. The links can be stored via the following structure: <Schema>\<Table Name>\<Attribute>\<Attribute Value>\<unique id>.hdb. One of skill in the art will appreciate that the .hdb file type is exemplary only, and many other file types can be implemented without departing from the spirit and scope of this disclosure. Storing data in two separate structures allows one to index the data by value and by unique identifier and to perform complex queries all with a single point of data. Whereas the prior art uses record sets (a record providing the set of all attributes), here, documents or rows can be loaded and traversed to match attribute values. A single point of data (e.g., an attribute value) can be located through the data model hierarchy, represented by a path (e.g., /dev/dog/attribute/attribute value/n.hdb) with a list of all the unique identifiers within this attribute value path, and any requested attributes can be easily obtained.

The following example query will shed further light on the operation of the HarperDB and its inherently fully-indexed quality. Queries can come into the database via NoSQL, SQL, via REST API over HTTP, or a command line interface, to name a few non-limiting examples. Queries can be formatted in SQL or NoSQL as well as other currently unsupported formats. A sample NoSQL query may look as follows:

```
{
"operation":"search_by_value",
"schema":"dev",
"table":"dog",
"hash_attribute":"id",
"search_attribute":"name",
"search_value":"Kato",
"get_attributes":["id", "breed"]
}
```

A sample SQL query may look as follows:
SELECT id, breed, FROM dev.dog where name LIKE 'Kato'

Both of these searches would return a single object array: [{id: 2,breed: "Whippet"}]

The database can then access raw data inside the matching files (i.e., names like kato). Based on the matching files, the database knows the IDs of the records that are to be returned. These IDs are then passed to a set of parallel processes that retrieve the value files for each attribute to be returned. Each process will get the files from <Schema>\<Table Name>\_hdb_hash\<Attribute>\. Once each process is complete, the data is stored as key value pairs. Once all sub-processes are finished they return their saved files to a process that consolidates the data and returns the NoSQL back to the requester.

Figure 10:
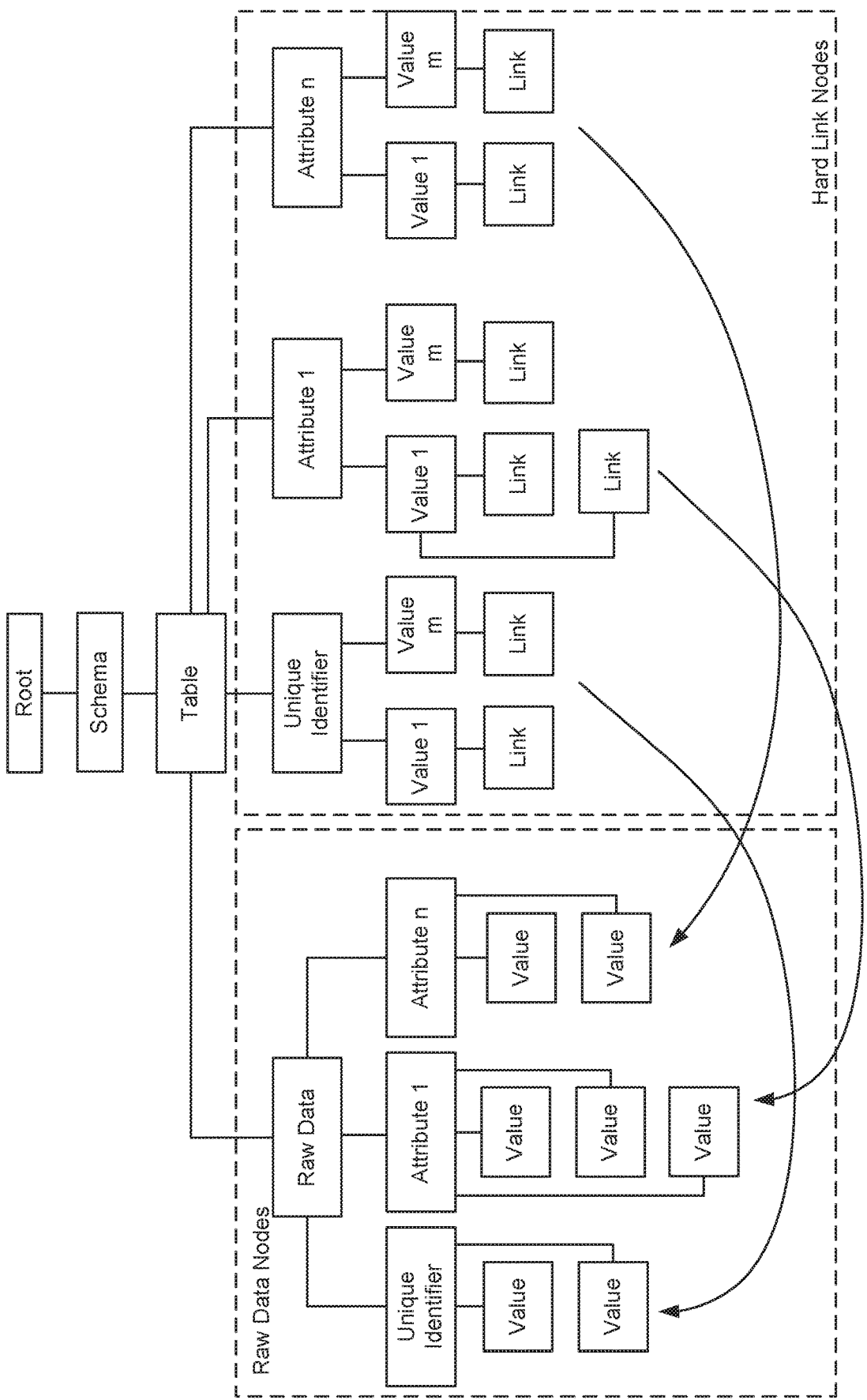
FIG. 10 illustrates an embodiment of a generalized storage structure for the HarperDB.

FIG. 10 illustrates a generalized version of an implementation of the HarperDB. This database includes a Root directory having a schema directory (e.g., "dev") as a child, which has a table directory (e.g., "dog") as a child. The table directory has two sets of nodes as its children: raw data nodes and hard link nodes. The raw data nodes have a raw data node (e.g., "_hdb_hash") as a topmost node. The hard link nodes have hard link attribute nodes as their topmost nodes (e.g., "ID," "name," and "breed" as seen in FIG. 9). The hard link attribute nodes (those attribute nodes in the hard link nodes) include a unique identifier attribute (e.g., ID, email, social-security-number, etc.), and then one or more other hard link attribute nodes (i.e., 1-n attributes). Here there are nodes for ID, attribute 1 and attribute n, where n is any positive integer, and any number of hard link additional attributes between 1 and n can be included. Each hard link attribute node has one or more value nodes (e.g., value 1 through value m and including additional value nodes between these when m>1). For instance, value nodes in FIG. 9 included "Kato," "Penny," and "Whippet" as a few examples. The value nodes can include one or more files therein, where each file is a hard link to a raw data file ("value" files) in the raw data nodes. Where there are two or more records with the same value for an attribute, there will be a corresponding number of two or more hard link files within that value node. For instance, there are two hard link files under the Value 1 node of the Attribute 1 node (e.g., two dogs both named Penny).

The hard links each provide an address of a raw data file in the raw data nodes. Raw data attribute nodes (attribute nodes in the raw data nodes) reside as children within the raw data node, and each of these raw data attribute nodes includes one or more value files (or raw data files).

The ID for a record can be used in the name of every hard link file and every raw data file, thereby providing an inherent means of indexing that does not require separate index storage or added write time to generate this index.

FIGS. 11-16 provide more detailed descriptions of methods for performing standard database operations (e.g., record insert, edit record, delete record, etc.), but in the context of the herein disclosed HarperDB.

Figure 11:
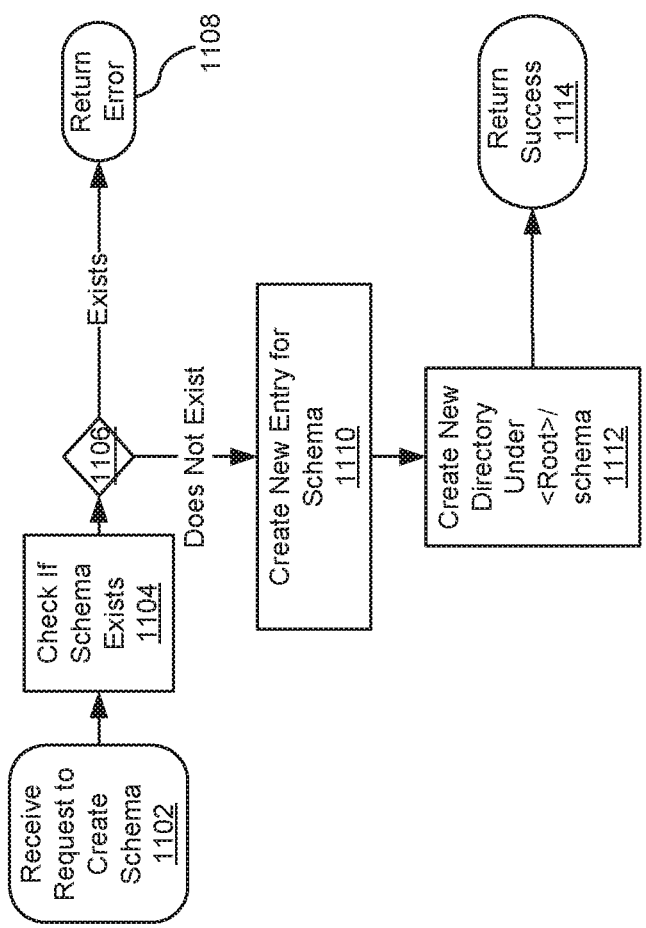
FIG. 11 illustrates a method of creating a new schema.

FIG. 11 illustrates a method of creating a new schema. The method can include receiving a request from a client application (e.g., API level) to create a schema (Block 1102). The database can then query metadata underlying the database (e.g., a <Root>/schema/system/hdb_table) to ensure that the new schema does not already exist (Block 1104). For instance, a query to <Root>/schema/system/hdb_table can be performed. If the schema exists, (Decision 1106=Exists), the database returns an error (Block 1108). If the schema does not exist (Decision 1106=Does Not Exist), then the database can create an entry for the new schema in the metadata (e.g., create new schema entry in the <Root>/schema/system/hdb_table) (Block 1110), create a new directory under <Root>/schema (Block 1112), and return a success message to the application (Block 1114). A database Root directory can be a parent to all schema nodes (e.g., "dev" in the example of FIG. 9). For instance, if the dev schema is to be created, then the method of FIG. 11 would create a directory under the general schema node, for instance in <Root>/schema/dev. The Root directory is not limited to schema directories, but can also include directories such as backup, config, doc, key, and logs, to name a few non-limiting examples. It should be noted, that throughout this disclosure a schema called "dev" has been used in examples. However, this is in no way limiting, and other schema names can be used without departing from the scope and spirit of this disclosure.

Figure 12:
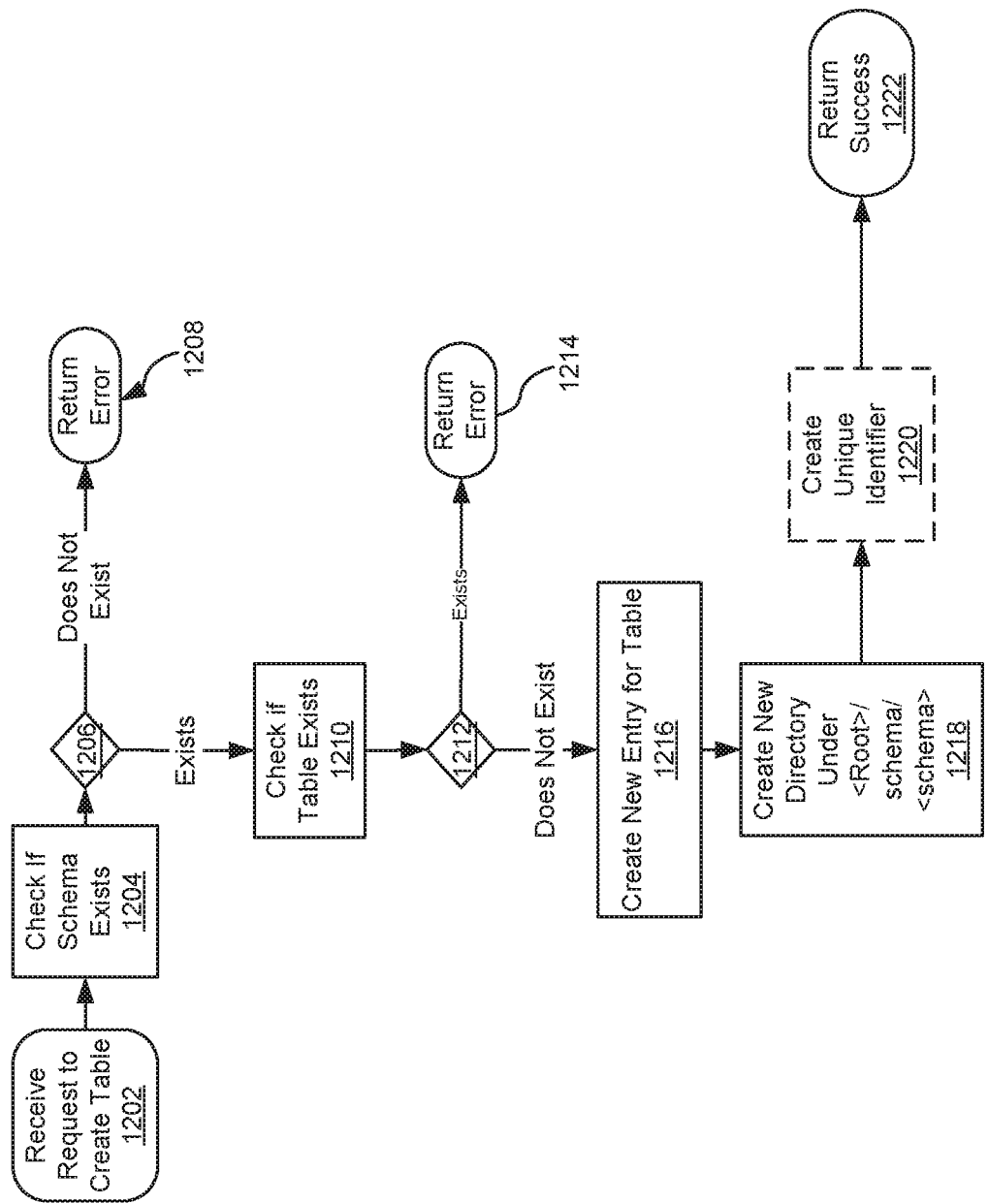
FIG. 12 illustrates a method of creating a table.

FIG. 12 illustrates a method of creating a table. The method starts with the HarperDB receiving a client request to create a table (Block 1202). The HarperDB then queries to see if the schema of the new table already exists (Block 1204). For instance, the HarperDB can query the <Root>/schema/system/hdb_schema to verify that the schema exists. If not (Decision 1206=Does Not Exist), then it returns an error (Block 1208). If the schema does exist (Decision 1206=Exists), then the HarperDB queries to verify that the table to be created does not already exist (Block 1210). For instance, it can query the <Root>/schema/system/hdb_table table to verify that the table does not exist. If it does (Decision 1212=Exists), then the HarperDB returns an error to the client application making the request (i.e., to the API layer) (Block 1214). If HarperDB confirms that the table does not exist (Decision 1212=Does Not Exist), then it creates an entry in the file system (e.g., <Root>/schema/system/hdb_table table) for the new table (Block 1216), creates a new table directory under <Root>/Schema/<schema>/ (Block 1218), and returns a success or table created message to the client application (Block 1222). Optionally, the method 1200 can also create a unique identifier (e.g., the "id" attribute in FIG. 9) as part of the table creation.

The Root directory can be any location on a server device. Below this is a schema sub node and within this node resides any number of schemas (e.g., dev in the example of FIG. 7). For instance, if the dog table is created under the dev schema, it could be stored in <Root>/schema/dev/dog. It is important to note that the dog node is a directory that can include attributes and attribute values within it. This contrasts with a typical database where the table is the lowest node in any storage hierarchy, and attributes, records, and values are added to this table—to the same document. Here, the table node has child nodes including at least the raw data nodes and the hard link nodes.

Figure 13:
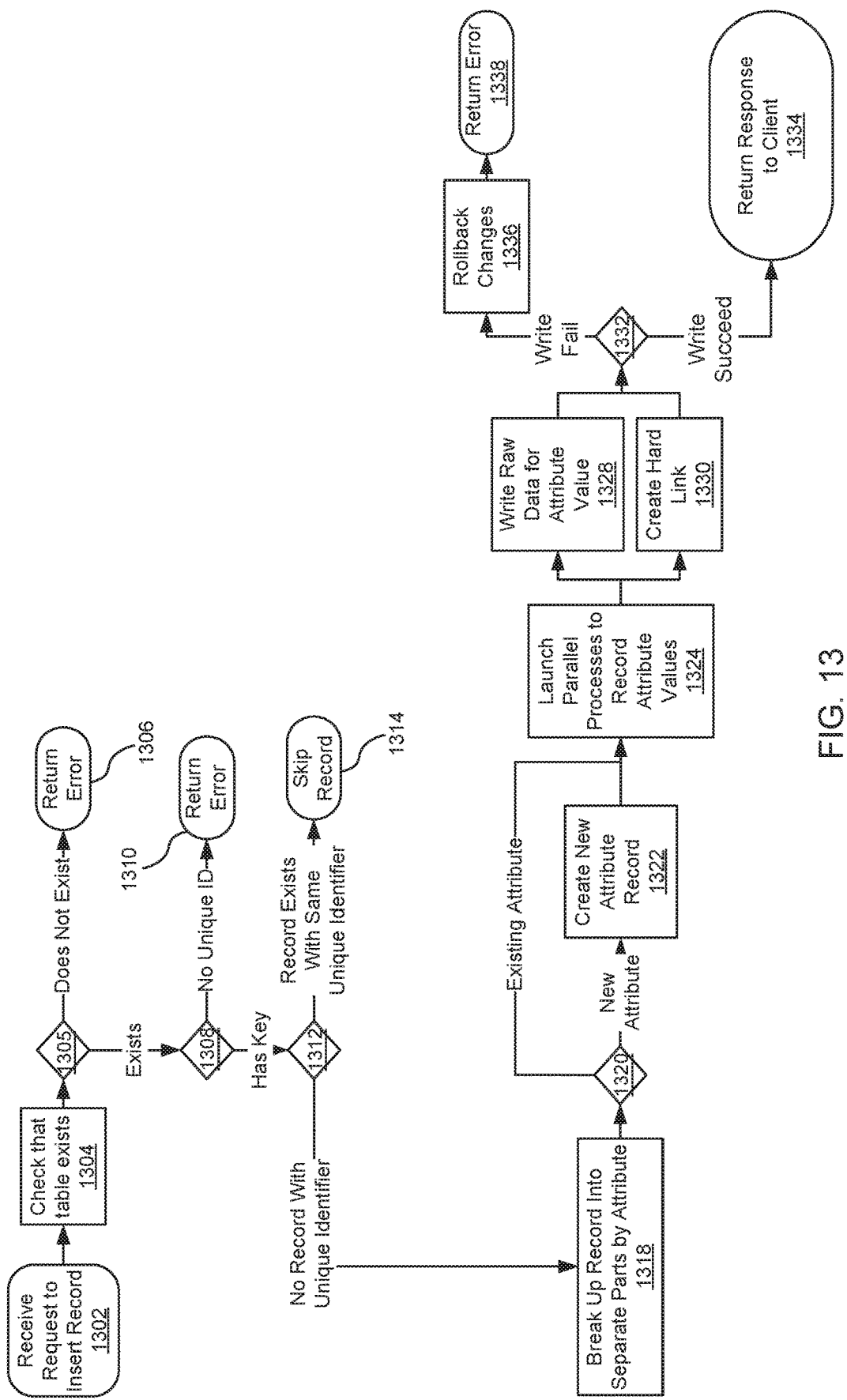
FIG. 13 illustrates a method of inserting a new record into an existing table.

FIG. 13 illustrates a method of inserting a new record into an existing table. The method 1300 can start with the database server receiving a client request for insertion of a new record (Block 1302). The database server can then check that the client's request provides a table matching an existing table in the database (Block 1304) (e.g., by querying <Root>/schema/system/hdb_table table to verify that the table exists). The analysis of the table parameter can be done using a parallel non-blocking asynchronous operation. If an existing table is not found (Decision 1305=Does Not Exist), then the database server can return an error to the client (Block 1306). If the database server finds an existing table matching the request (Decision 1305=Exists), then the database server can validate that the client request includes a unique identifier (e.g., ID, primary key, social-security-number, GUID) (Decision 1308) (e.g., "ID" in FIGS. 9 and 10). If not (Decision 1308=No Key), then the database server can return an error to the client (Block 1310). If a unique identifier is included (Decision 1308=Has Key), then for each unique identifier provided, the database server can search for matching unique identifier values (Decision 1312). Records with the same unique identifier (Decision 1312=Record Exists With Same Unique Identifier) are skipped and added to skipped records for the client response (Block 1314). Where no records exist with the unique identifier(s) provided in the client request (Decision 1312=No Record Exists With Same Unique Identifier), the database server can then break up each of the one or more records from the client request into separate parts (Block 1318) (i.e., broken up by attribute). For instance, a record to be inserted that includes a unique identifier and two attribute values would be broken up into those three separate elements. The database server can then check to see if one or more attribute directories need to be added for the record to be inserted (i.e., does the new record include any attributes not already in the table?) (Decision 1320). If the client request includes a new attribute (Decision 1320=New Attribute), then the database server can create a new record (e.g., create a new record in <Root>/schema/<schema>/<table>/<attribute>) (Block 1322). For instance, in FIG. 7 the request could include ID, name, breed, and an "owner" attribute, in which case, the database server would need to add a new attribute record called "owner" to the table (i.e., to the <Root>/schema/<schema>/<table>/<attribute>). If the new record does not include a new attribute (Decision 1320=Existing Attribute), then no new attribute needs to be added. This shows that the HarperDB has a dynamic schema (sometimes called "schemaless") in that no strict rules on data types and attributes allowed (e.g., attributes (columns) can be added at any time). In comparison, most prior art databases require that all attributes be defined at table creation.

Either way, the database server can then launch parallel processes for writing the new attribute values for the new record (Block 1324). For each new record the database server can then perform the following in a parallel non-blocking asynchronous manner: (1) write raw data values to the raw data nodes under their respective attribute nodes (Block 1328); and (2) write hard link files in the hard link nodes under their respective attribute value nodes (Block 1330). For instance, the raw data can be written to <Root>/schema/<schema>/<table>/_hdb_hash/<attribute>/<unique id>.hdb and the hard links can be written to <Root>/schema/<table>/<attribute>/<attribute value>/<unique id>.hdb. If the write is successful (Decision 1332=Write Succeed), then the database server can return a response to the client that the add record operation was successful along with data regarding any records that were skipped (Block 1334). On write fail (Decision 1332=Write Fail), the database server can rollback all changes (Block 1336) and return an error to the client (Block 1338).

Figure 14:
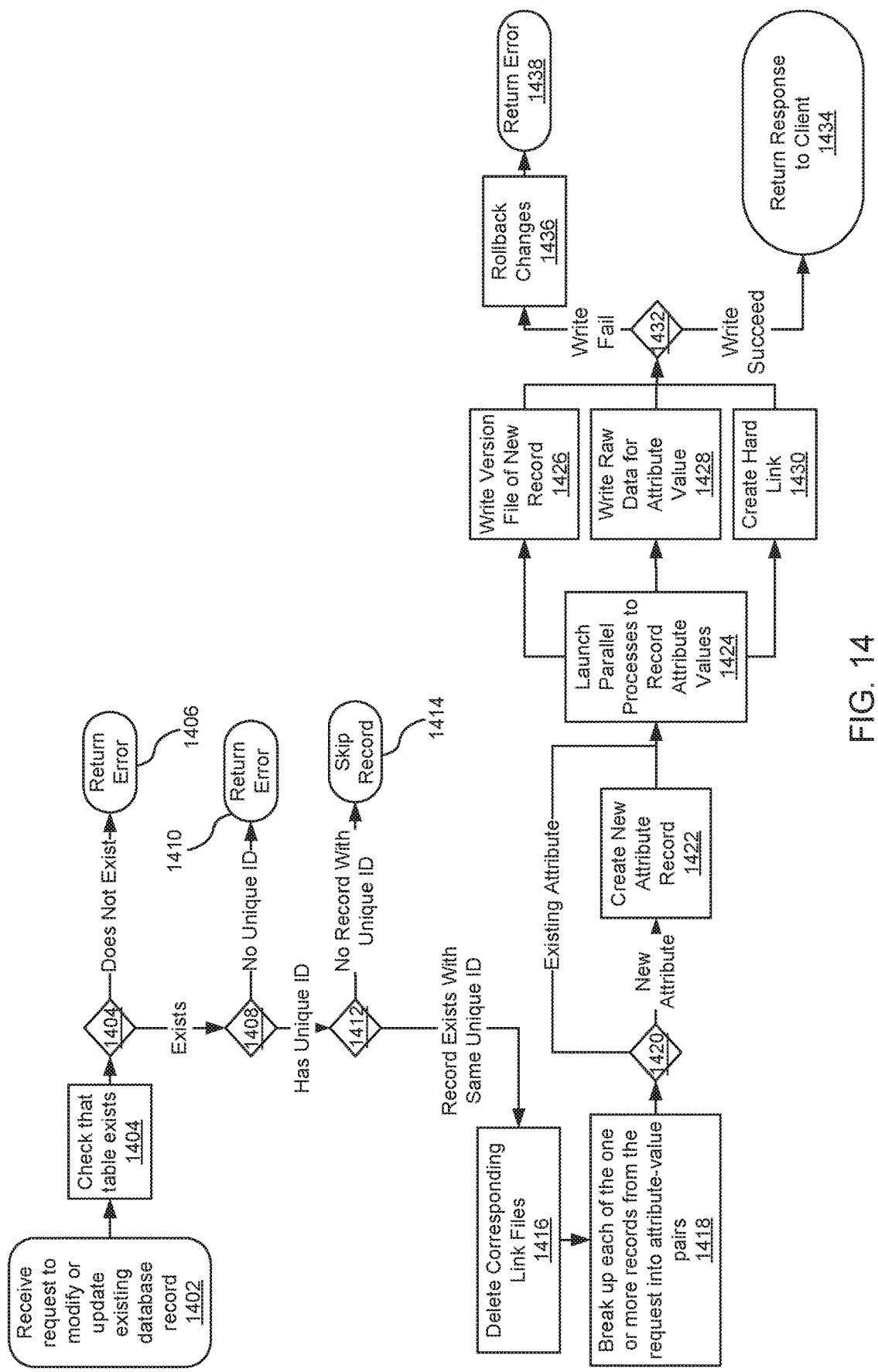
FIG. 14 illustrates a method for a database server to respond to a client request for modification or update to an existing record in the database.

Updating a record follows a similar method (see FIG. 14), but with some subtle distinctions. FIG. 14 illustrates a method for a database server to respond to a client request for modification or update to an existing record in the database. The method 1400 can start with the server receiving the request from the client (Block 1402). The database server can then check that the client's request provides a table matching an existing table in the database (Decision 1404) (e.g., by querying <Root>/schema/system/hdb_table table to verify that the table exists). The analysis of the table parameter can be done using a parallel non-blocking asynchronous operation. If an existing table is not found (Decision 1404=Does Not Exist), then the database server can return an error to the client (Block 1406). If the database server finds an existing table matching the request (Decision 1404=Exists), then the database server can validate that the client request includes a unique identifier (Decision 1408). If not (Decision 1408=No Key), then the database server can return an error to the client (Block 1410). If a unique identifier is included (Decision 1408=Has Key), then for each unique identifier provided, the database server can search for matching unique identifier values (Decision 1412). Records not matching an existing unique identifier (Decision 1412=No Record Exists With Same Unique Identifier) are skipped and added to skipped records for the client response (Block 1414). In practice, the client may request an update of all records where name=rosemary from owner=zach to owner=zachery. The HarperDB would ascertain the unique identifier of the resulting record(s) and update those records using the unique identifier. For each existing unique identifier (Decision 1412=Record Exists With Same Unique Identifier), the database server can find corresponding hard link files for those attributes to be modified, and delete the existing hard link files (Block 1416). The database server can then break up each of the one or more records from the request into attribute-value pairs (Block 1418) (i.e., broken up by attribute). For instance, breed-Whippet and breed-GreatDane are two examples of attribute-value pairs from the example of FIG. 9. The database server can then check to see if the update includes a new attribute (Decision 1420). If the client request includes a new attribute (Decision 1420=New Attribute) (even if some of the attributes to be modified are not new), then the database server can create a new record (e.g., create a new record in system.hdb_attribute table (i.e., <Root>/schema/system/hdb_attribute as well as <Root>/schema/<schema>/_hdb_hash/<attribute> and <Root>/schema/<schema>/<table>/<attribute>)) (Block 1422). For instance, in FIG. 9 the request could ask for writing of values to an "owner" attribute, in which case, the database server would need to add a new attribute record called "owner" to the system.hdb_attribute table. There could also be a parallel process to create the new attribute in the raw data nodes (e.g., <Root>/schema/<schema>/<table>/_hdb_hash/owner). Values for the new attribute could be written in parallel as <Root>/schema/<schema>/<table>/owner/unique id.hdb and <Root>/schema/<schema>/<table>/_hdb_hash/owner/unique id.hdb. The database server can then launch parallel processes for writing any new value(s) of the new attribute (Block 1424). If the request merely asks for editing of a value or values in an existing attribute or attributes (Decision 1420=Existing Attribute), then the database server can launch parallel processes for writing the new values (Block 1424).

For each records attribute(s), in a parallel non-blocking asynchronous manner, the database server can (1) write a temporary version file of the new record (Block 1426), (2) write raw data for the attribute value to the raw data directory (e.g., <Root>/schema/<schema>/<table>/_hdb_hash/<attribute>/<unique id>.hdb (Block 1428), and (3) create a hard link pointing to the corresponding raw data (e.g., <Root>/schema/<schema>/<table>/<attribute>/<attribute value>/<unique id>.hdb) (Block 1430). If the write is successful (Decision 1432=Write Succeed), then the database server can return a response to the client of the one or more successful write operations and indications of any records that were skipped (Block 1434). On write fail (Decision 1432=Write Fail), the database server can rollback all changes (Block 1436) (e.g., delete the temporary version of the file and return to a previous version) and return an error to the client (Block 1438).

Figure 15:
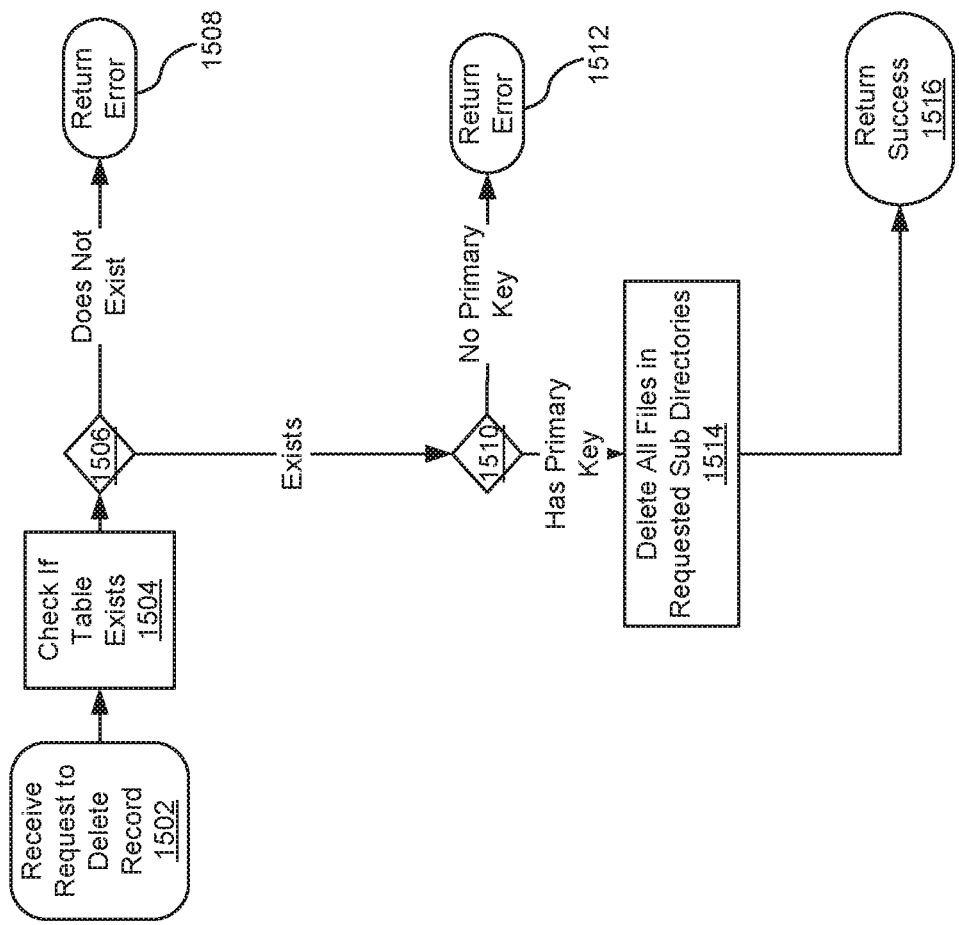
FIG. 15 illustrates a method of deleting an existing record.

FIG. 15 illustrates a method of deleting an existing record. The method can include receiving a request from a client application (e.g., API level) to delete an existing record (Block 1502). The database server can then query metadata underlying the database (e.g., a <Root>/schema/system/hdb_table) to ensure that the table to be deleted exists (Block 1504). If the table does not already exist (Decision 1506=Does Not Exist), then the server can return an error (Block 1508). If the table does exist (Decision 1506=Exists), then the database server can validate that the record includes a unique identifier, and if not (Decision 1510=No Unique Identifier), then the database server can return an error to the client application (Block 1512). If the record does include a unique identifier (Decision 1510=Has Unique Identifier), then subdirectories for that record can be deleted (Block 1514) (e.g., deleted from <Root>/schema/<table>/_hdb_hash/<attribute>/<unique id>.hdb and from <Root>/schema/<table>/<attribute>/<unique id>.hdb). Once the record has been deleted, a return success can be issued (Block 1516).

Figure 16:
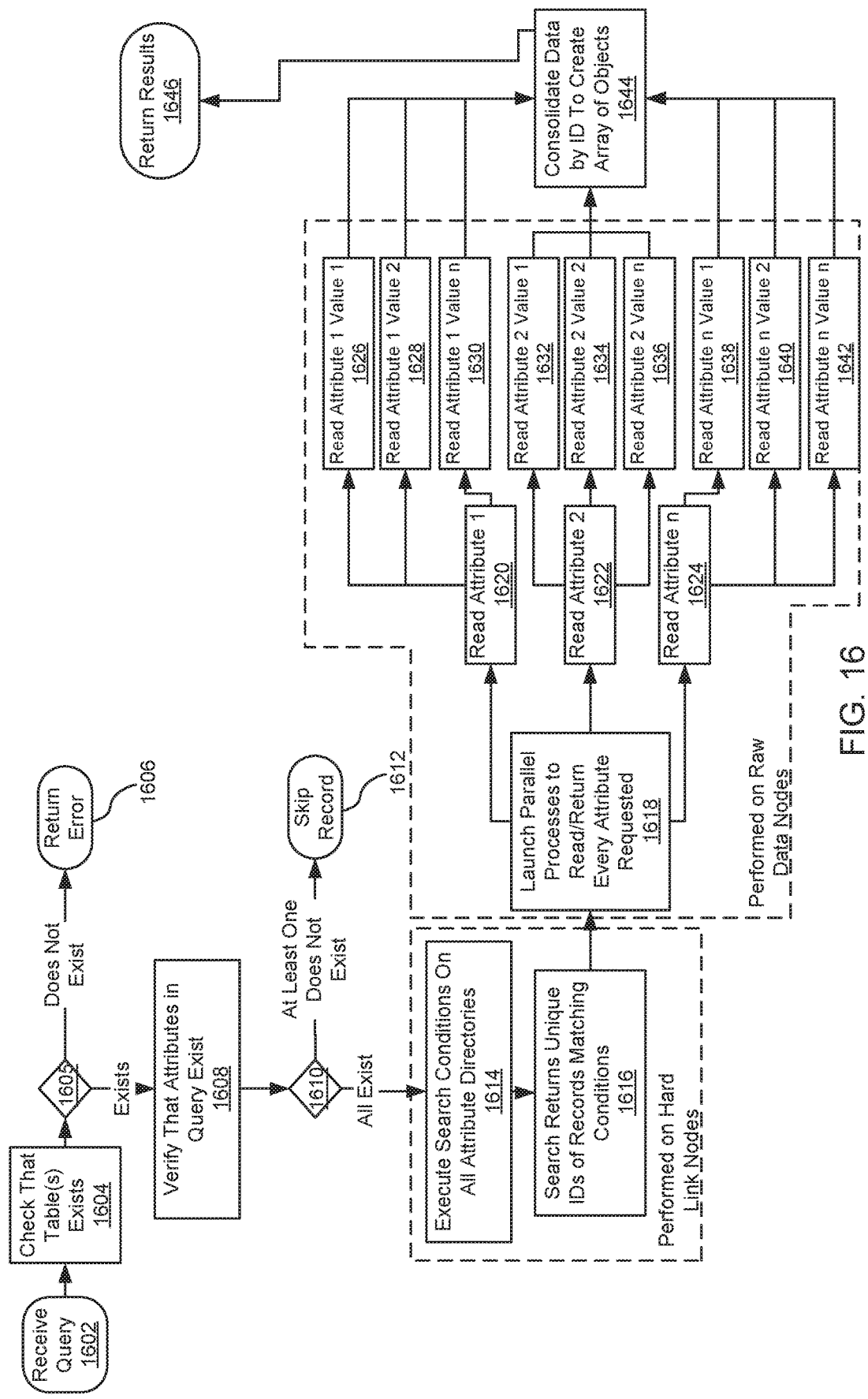
FIG. 16 illustrates a method of performing a query to an embodiment of the database.

FIG. 16 illustrates a method of performing a query to an embodiment of the database. The method 1600 includes the database server receiving a query request from a client application (Block 1602). The database server can first check that a one or more tables in the quest exist (Block 1605). This can be performed in a parallel non-blocking asynchronous manner. If not (Decision 1605=Does Not Exist), then the database server can return an error (Block 1606). If the one or more tables do exist (Decision 1605=Exists), then the database server can verify that all attributes in the request exist (Block 1608). If any of the attributes do not exist (Decision 1610=At Least One Does Not Exist), then the database server can skip that record (Block 1612). If all attributes exist (Decision 1610=All Exist), then the database server can execute a search on all attribute directories (Block 1614) (e.g., within the attribute directories in the hard link nodes of FIG. 10). This retrieval is executed for each attribute that is part of a conditional, join and ordering the client request provided. The results from Block 1614 are a list of unique identifiers (or hash values) (Block 1616). Blocks 1614 and 1616 are directed to the hard link nodes of the HarperDB. The unique identifiers can then be used to perform a secondary search on the raw data nodes (Block 1618). However, this secondary search involves a plurality of parallel searches, each looking to a different one of the requested attributes, and this secondary search involves two steps. First, the search can identify the attribute nodes below the raw data node (Blocks 1620, 1622, 1624) for those attributes requested in the query. For instance, one search for each attribute requested in the query can be made (e.g., <Root>/schema/<table>/_hdb_hash/<attribute>) where FIG. 16 shows searches for attributes 1 through n. Then, within each attribute node, the database server identifies and reads the raw data files corresponding to the unique identifiers found in Block 1616 (Blocks 1626, 1628, 1630, 1632, 1634, 1636, 1638, 1640, 1642). For instance, the following raw files could be read for attribute 1: <Root>/schema/<schema>/<table>/_hdb_hash/<attribute_1>/id_1.hdb (Block 1626); Root>/schema/<schema>/<table>/_hdb_hash/<attribute_1>/id_2.hdb (Block 1628); <Root>/schema/<schema>/<table>/_hdb_hash/<attribute_1>/id_n.hdb (Block 1630). These values can then be consolidated by unique identifier into an array of attribute-value pair objects, in the data format known as NoSQL (Block 1644). The client request is then returned the JSON object array (Block 1646).

FIG. 7 illustrates one method of operating the HarperDB to respond to a write request. The method 700 can include receiving a request from an API level of a database system at either a primary interpreter for a first data format (e.g., NoSQL interpreter) or a primary interpreter for a second data format (e.g., SQL interpreter) (Block 702). The request can be to write one or more attribute values of a record to a datastore of the HarperDB. The method 700 can include passing the request from whichever primary interpreter received the request to a standard operations (Block 704). The method 700 can include separating the request into attribute values at the standard operations (Block 706) and the standard operations performing a write operation to the datastore for each of the attribute values, this writing being performed in parallel for each attribute (Block 708). Upon completion of the write operations (Block 708), the HarperDB can return an indicator to the API level through the corresponding primary interpreter, indicating that the attribute values have been written to the database (Block 710).

FIG. 8 illustrates one method of operating the HarperDB to respond to a query. The method 800 can start with receipt of a request from an API level of a database system at a primary interpreter corresponding to one or more data formats that the HarperDB is configured to operate with (e.g., a SQL interpreter or a NoSQL interpreter) (Block 802). The request can be to read one or more attributes of a record in a datastore of the HarperDB matching a query attribute. The HarperDB can then pass the request from the primary interpreter to a standard operations (Block 804). The standard operations can perform a primary query for any objects in the datastore matching the query attribute (Block 806). The HarperDB can then identify a unique ID associated with each object found in the primary query (Block 808). The standard operations can perform one or more secondary queries to the datastore in parallel, where each secondary query obtains attribute values corresponding to one of the unique IDs and one of the one or more attributes (Block 810). Results of the one or more secondary queries can be coalesced into a result object and returned to the API level via the standard operations and primary interpreter through which the request was received (Block 812).

Although the terms folders and directories have been used in this application, it is within the scope of this disclosure to use other than folders and directories for the nodes in the HarperDB data schema.

The methods described in connection with the embodiments disclosed herein may be embodied directly in alternative hardware situations where Node.js can be compiled into binaries on operating systems (e.g., Unix-based) and run the HarperDB application. A unique feature of Node.js and the disciplined approach to the development of the HarperDB server, is that the same application, with all of the features, can run on microcomputers to super computers without minimizing any features. Many competitors in the space require alternative applications to be downloaded and installed on the specific device, for example an internet of things device, and the feature set and capabilities can be limited to a specific and smaller domain.

Advantages of the Disclosure

As compared to known databases (e.g., indexed attributes/columns), the HarperDB requires less storage since traditional industry standard methods of indexing are not performed or needed. Further, a query can return a specific attribute value, whereas known database queries (e.g., a NoSQL or SQL query) return an entire record (or row) then parse the row for a single attribute the client may have requested using unnecessary resources, when the single attribute was all that was requested. In particular, HarperDB indexing is inherent because the unique allocation of persistent storage, "natively" provides an index for every table attribute, this unique feature creates no performance overhead as well as removing extra data, traditionally augmented with current industry standard database indexing methods. Current traditional industry standard database indexing involves data duplication, background jobs, and is CPU and memory intensive. With HarperDB, the CPU and memory overhead are greatly reduced if not eliminated.

Said another way, embodiments disclosed herein can be fully-indexed, but without the typical increase in storage footprint or management that existing databases see when fully indexed. When existing products add an index or additional indexes, each new index requires storage since a new index file must be created to manage the index as well as temporary memory storage to search the file when referenced. By exploding data on ingest and storing each attribute separately, the herein disclosed embodiments inherently fully-index. This enables faster read and write performance without replicating data or using memory to store indexes.

Most products that provide both NoSQL and SQL capability do this using a concept called "multi-model." Multi-model either duplicates data to present it in both a NoSQL format as well as a table & row structure or it utilizes significant amounts of RAM to do NoSQL to SQL transformations in memory. This is expensive from a RAM and storage perspective. Embodiments of the present disclosure re "single model," meaning that there is no transformation of data from NoSQL to SQL or vice versa, and as a result the client sees significant decreases in storage and RAM as compared to multi-model systems.

Most products that can provide full ANSI SQL capability with joins and multi conditions include schema management (e.g., defined tables, columns, data types, and indices). Defining these aspects often slows down integration and means that these solutions have difficulty ingesting unstructured data as that data can change from insert to insert (i.e., will not meet an existing schema definition). Embodiments of the present disclosure have a "dynamic schema," meaning that they can ingest unstructured data while at the same time providing complex SQL capabilities.

The herein disclosed embodiments offer fully featured SQL with features that are unique to the disclosed database like cross table joins, functions, and multiple conditions.

The herein disclosed embodiments offer full create, read, update, and delete (CRUD) operations via SQL like any traditional relational database management system (RDBMS), which is intended to accommodate applications and business intelligence use cases. This allows ingestion of data via standard SQL INSERT and UPDATE operations as well as offering complex SQL queries with no performance impact on unstructured data. Joins, multiple operators, and multiple conditions are possible in sub second time.

The herein disclosed embodiments can be written in Node.js, and as a result they can leverage existing operating system technology, leading to a smaller footprint than prior art databases which require many resources as well as their application being a relatively large code base. For instance, in an embodiment, the herein disclosed database is less than 50 MB compiled or less than 100 MB compiled. This means that the herein disclosed embodiments can be deployed on a device with limited resources (e.g., a Raspberry Pi or other IoT devices) while also being scalable to take advantage of systems with massive cloud storage and processing power.

The herein disclosed embodiments also allow handling of high volumes of transactions of unstructured data such as IoT data or social media posts while staying ACID compliant. Structured data also can be handled at high volume without row locks. Meanwhile, data can be queried and analyzed in realtime with no transformation or duplication. All of these workloads can execute simultaneously with no degradation in performance.

The herein disclosed embodiments enable both horizontal and vertical scaling. While Node.js is not inherently multi-threaded, the Node engine does allow for finite control of resources such as CPU and threads. As a result, these embodiments allow for maximization of hardware resources. As Node.js was first developed as a web server, horizontal scaling capability of these embodiments is robust and hardened allowing for the herein disclosed systems to be easily deployed across multiple resources of varying sizes.

A REST API can be used to interface with embodiments of the herein disclosed database. These embodiments have a single end point with a consistent NoSQL object model that allows a client to simply and explicitly interact with data.

Figure 17:
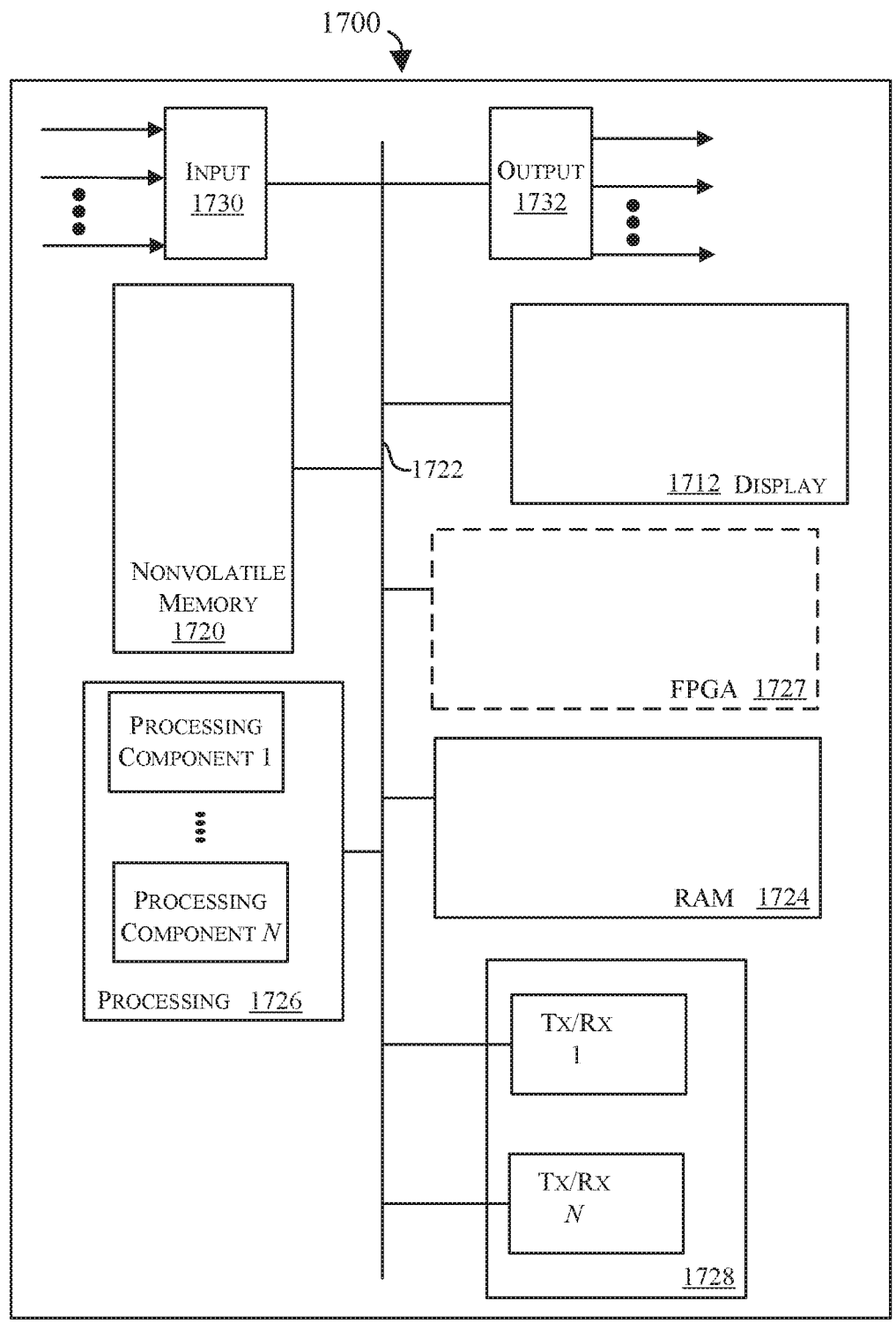
FIG. 17 illustrates a block diagram depicting physical components that may be utilized to realize the HarperDB and data schema according to an exemplary embodiment.
Figure 18:
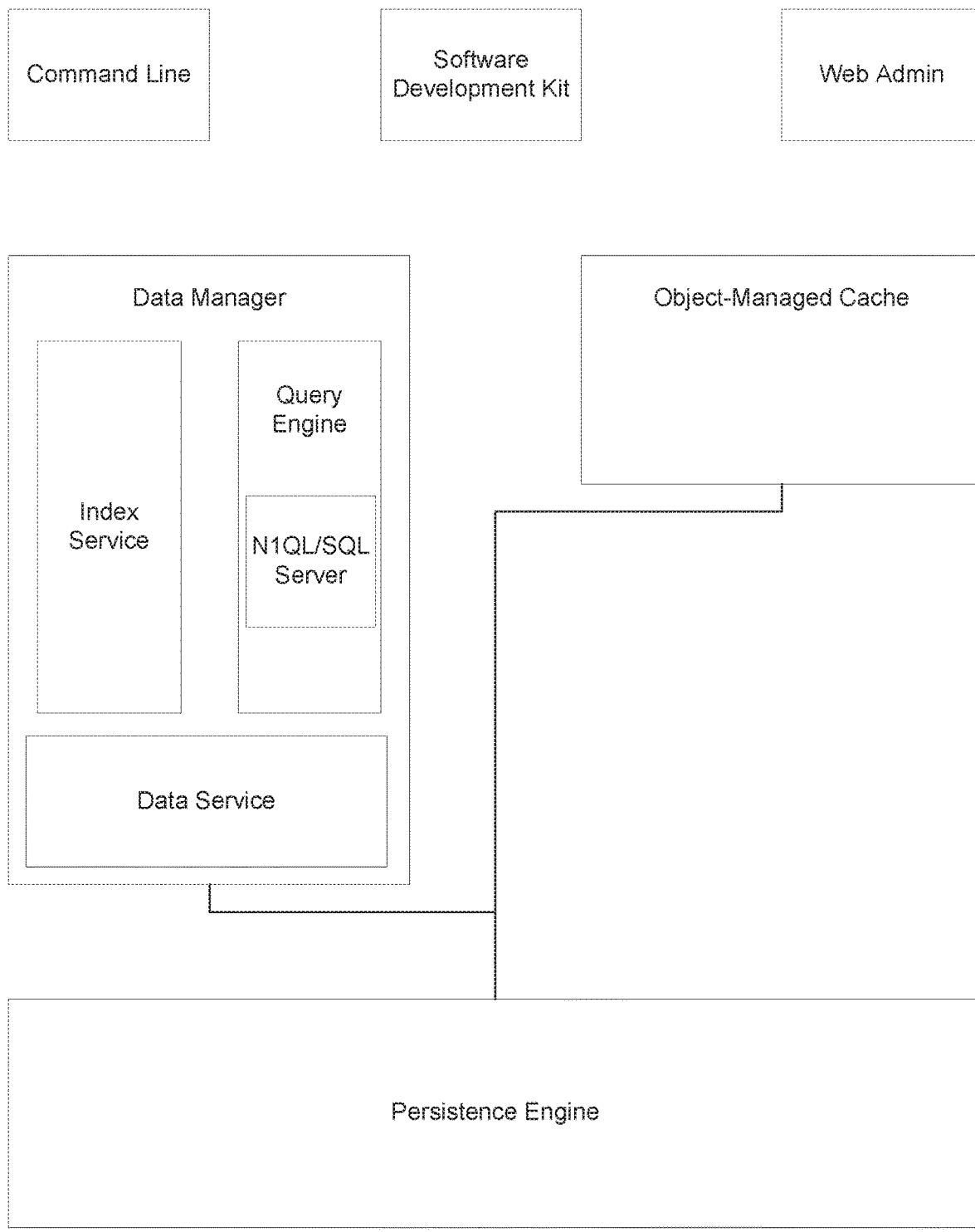
FIG. 18 illustrates an embodiment of a computing device or system for implementing the HarperDB.
Figure 19:
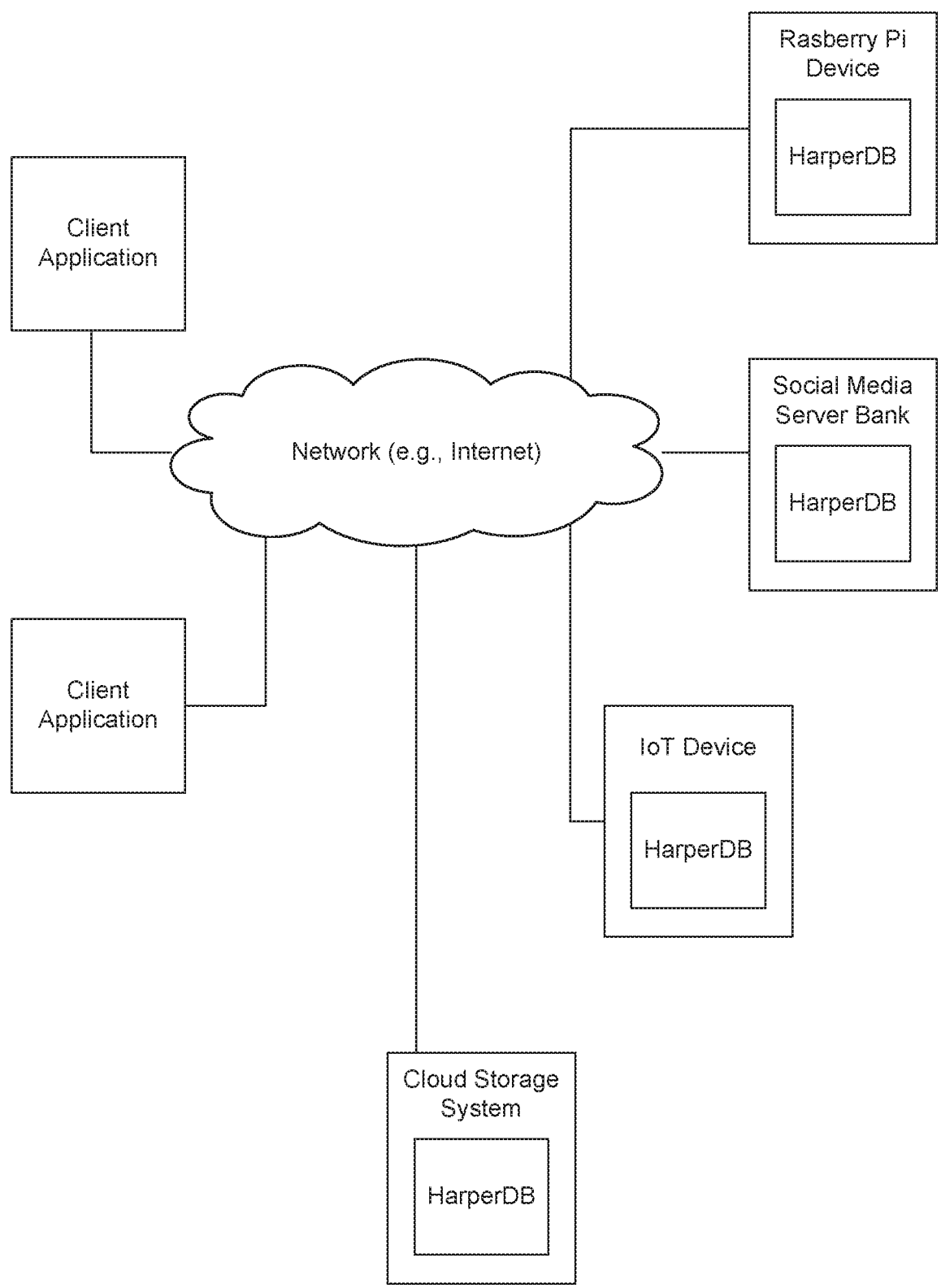
FIG. 19 illustrates an embodiment of system for implementing the HarperDB in various devices/systems such as a Rasberry Pi device, social media server bank, IoT device, and a cloud storage system (to name a few non-limiting examples)
Figure 20:
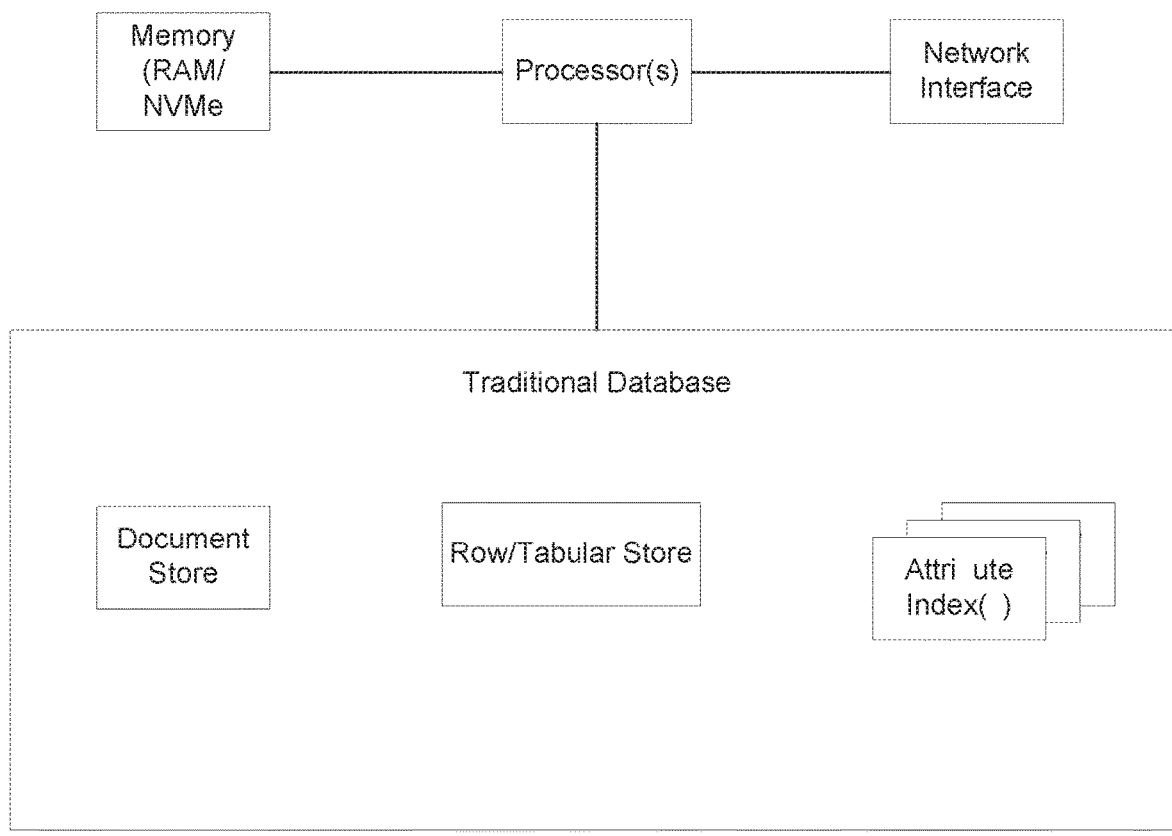
FIG. 20 illustrates a traditional database device/system.
Figure 21:
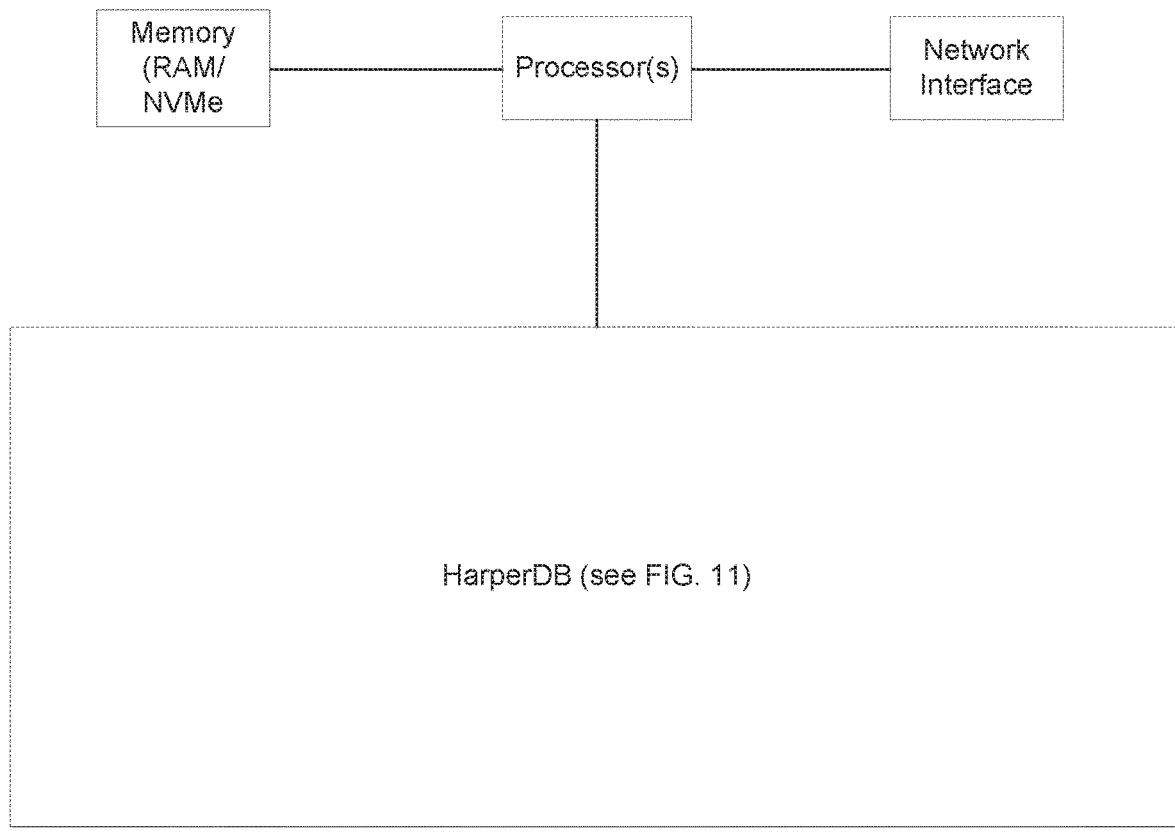
FIG. 21 illustrates a device/system upon which the HarperDB can be implemented.
Figure 22:
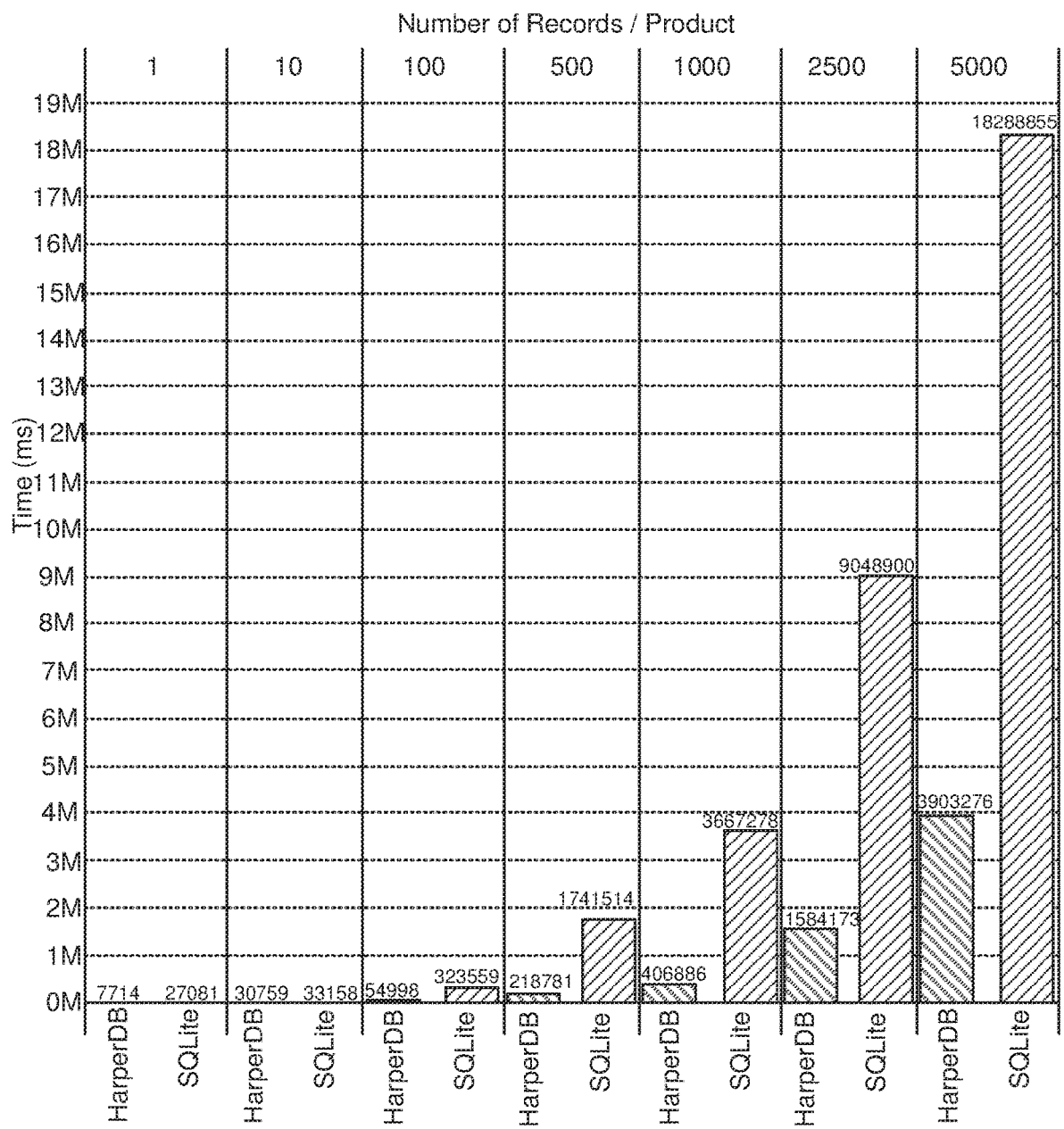
FIG. 22 illustrates a graph showing HarperDB's performance compared to SQLite for various record insertion cases.

The methods described in connection with the embodiments disclosed herein may be embodied directly in hardware, in processor-executable code encoded in a non-transitory tangible processor readable storage medium, or in a combination of the two. Referring to FIG. 17 for example, shown is a block diagram depicting physical components that may be utilized to realize the HarperDB and data schema according to an exemplary embodiment. As shown, in this embodiment a display portion 1712 and nonvolatile memory 1720 are coupled to a bus 1722 that is also coupled to random access memory ("RAM") 1724 (or NVMe), a processing portion (which includes N processing components) 1726, an optional field programmable gate array (FPGA) 1727, and a transceiver component 1728 that includes N transceivers. Although the components depicted in FIG. 17 represent physical components, FIG. 17 is not intended to be a detailed hardware diagram; thus, many of the components depicted in FIG. 17 may be realized by common constructs or distributed among additional physical components. Moreover, it is contemplated that other existing and yet-to-be developed physical components and architectures may be utilized to implement the functional components described with reference to FIG. 17.

This display portion 1712 generally operates to provide a user interface for a user, and in several implementations, the display is realized by a touchscreen display. In general, the nonvolatile memory 1720 is non-transitory memory that functions to store (e.g., persistently store) data and processor-executable code (including executable code that is associated with effectuating the methods described herein). In some embodiments for example, the nonvolatile memory 1720 includes bootloader code, operating system code, file system code, and non-transitory processor-executable code to facilitate the execution of a method described with reference to FIGS. 6-8 and 11-16 described further herein.

In many implementations, the nonvolatile memory 1720 is realized by flash memory (e.g., NAND or ONENAND memory), but it is contemplated that other memory types may be utilized as well. Although it may be possible to execute the code from the nonvolatile memory 1720, the executable code in the nonvolatile memory is typically loaded into RAM 1724 and executed by one or more of the N processing components in the processing portion 1726.

The N processing components in connection with RAM 1724 generally operate to execute the instructions stored in nonvolatile memory 1720 to enable creation, editing, and querying of the HarperDB. For example, non-transitory, processor-executable code to effectuate the methods described with reference to FIGS. 6-8 and 11-16 may be persistently stored in nonvolatile memory 1720 and executed by the N processing components in connection with RAM 1724. As one of ordinarily skill in the art will appreciate, the processing portion 1726 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1726 may be configured to effectuate one or more aspects of the methodologies described herein (e.g., the methods described with reference to FIGS. 6-8 and 11-16). For example, non-transitory processor-readable instructions may be stored in the nonvolatile memory 1720 or in RAM 1724 and when executed on the processing portion 1726, cause the processing portion 1726 to execute the receipt and execution of queries, table updates, and other SQL and NoSQL operations in the HarperDB. Alternatively, non-transitory FPGA-configuration-instructions may be persistently stored in nonvolatile memory 1720 and accessed by the processing portion 1726 (e.g., during boot up) to configure the hardware-configurable portions of the processing portion 1726 to effectuate the functions of the HarperDB.

The input component 1730 operates to receive signals (e.g., SQL and NoSQL requests to operate on the HarperDB) that are indicative of one or more aspects of the client requests to the HarperDB. The signals received at the input component may include, for example, a NoSQL query or SQL create new attribute request, to name two non-limiting examples. The output component generally operates to provide one or more analog or digital signals to effectuate an operational aspect of the HarperDB returning operation success signals to the API level or returning query results from the HarperDB. For example, the output portion 1732 may provide the query results described with reference to FIG. 15.

The depicted transceiver component 1728 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Test Data and Comparison to Existing Databases

The following provides test data demonstrating the advantages of the herein disclosed HarperDB. The purpose of this benchmark test was to evaluate an HTAP use case commonly found in IoT architectures. The goal was to evaluate data writes and aggregate reads to demonstrate increasing data size and real-time analytical capability. For the scope of this test HarperDB was compared to SQLite (https://www.sqlite.org/index.htm), a popular IoT database on the same RASBERRY PI$_3$ Model B (https://www.raspberrypi.org/products/raspberry-pi-3-model-b/).

To evaluate both solutions simple apps were created using Node.js. In HarperDB the native REST API was utilized. In SQLite the sqlite3 (https://www.npmjs.com/package/sqlite3) and mydb.db (https://www.npmjs.com/package/mydb) libraries were utilized. The app takes both databases through the same process. In each test the data is purged before the next test is run. A varying number of records are simultaneously inserted into each product. The results are then queried in aggregate using a SELECT COUNT SQL query. In each case the steps that make up the process are designed to benefit each product. The process appears as follows in each app:

|   | The Disclosed Database | SQLITE |
|---|---|---|
| 1 | create_schema | drop_table if exists |
| 2 | create_table | create_table |
| 3 | begin timer | begin timer |
| 4 | Insert | prepared statement insert |
| 5 | select count sql statement | select count sql statement |
| 6 | end timer | end timer |
| 7 | drop table |  |

As one can see from the above, the insert and the select statements are the only elements of the test being timed. Each table is named "dog". Each insert has the same four attributes/columns: id, name, age, and breed. The id column is a randomly generated UUID using the uuid/v4 package in Node. Both SQL statements look as follows: "SELECT count(id) from dog" In HarperDB the id column is defined as the unique identifier or hash column and the remaining columns are dynamically indexed upon insert. This is native to HarperDB and a feature that cannot be disabled. To reduce overhead on SQLite only the unique identifier was indexed, and this is the column used in both SQL queries. We performed the test inserting 1, 10, 100, 500, 1000, 2500, and 5000 records into the database. To avoid variance in the results each test was performed 5 times at each level. The results displayed below represent the average of each test.

The code for the tests can be downloaded and examined here: https://github.com/HarperDB/harperdb-sqlite-benchmark.

HarperDB outperformed SQLite on all test cases, and on average was 581% faster. The greatest difference was seen at a 1,000 record insert where HarperDB was 901.30% faster than SQLite where the roundtrip was 20955.88 ms for SQLite and 2305.06 ms or HarperDB. The averaged test results can be seen in the charts below.

| Number of Records | Product | Avg. Time (ms) |
|---|---|---|
| 1 | SQLite | 154.75 |
| 1 | HarperDB | 44.08 |
| 10 | SQLite | 189.48 |
| 10 | HarperDB | 175.76 |
| 100 | SQLite | 1848.91 |
| 100 | HarperDB | 314.27 |
| 500 | SQLite | 9951.51 |
| 500 | HarperDB | 1250.17 |
| 1000 | SQLite | 20955.88 |
| 1000 | HarperDB | 2325.06 |
| 2500 | SQLite | 51707.10 |
| 2500 | HarperDB | 9052.419 |
| 5000 | SQLite | 104507.74 |
| 5000 | HarperDB | 22303.44 |

For resource limited devices, such as micro computer and IoT devices, having the ability to load data as well as do analytics is advantageous for real-time decision-making use cases. The alternative is to synchronize data from these devices to a central server where analytics can be performed in an eventually consistent manner. SQLite is the industry standard database for micro computers and embedded devices. The test was performed on a consumer grade development board, about the size of a credit card, featuring mid-tier level processor and 1 GB of RAM.

The benchmark ran 5 iterations of 1, 10, 500, 1000, 2500, and 5000 record writes, clearing the data between writes. Each iteration was timed for successful responses from the server, then averaged over the 5 iterations. Save the single record insertion scenario, HarperDB had significantly better times. As more records were attempting to be written the average time increased Not only does HarperDB support writing, it can also support analytics from the device, without having it programmed into the application, whereas in SQLite, analytics are programmed into the application prior to deployment.

| Product | Records | Average Time(MS) | Percentage Difference |
|---|---|---|---|
| harperdb | 1 | 216.4514 | 185.88% |
| sqlite | 1 | 116.447 | 53.80% |
| harperdb | 10 | 235.1224 | 60.92% |
| sqlite | 10 | 385.9722 | 164.16% |
| harperdb | 100 | 441.7044 | 14.12% |
| sqlite | 100 | 3128.8684 | 708.36% |
| harperdb | 500 | 1671.6978 | 10.88% |
| sqlite | 500 | 15362.8212 | 919.00% |
| harperdb | 1000 | 2924.3044 | 9.49% |
| sqlite | 1000 | 30811.521 | 1053.64% |
| harperdb | 2500 | 10907.8924 | 14.21% |
| sqlite | 2500 | 76777.337 | 703.87% |
| harperdb | 5000 | 30384.2424 | 19.78% |
| sqlite | 5000 | 153637.1556 | 505.65% |

HarperDB Advantages over MySQL

| 250 Concurrent Connections | MySQL | HarperDB |
|---|---|---|
| Avg CPU 1 min/100,000 records | 20%; 19.5% | 26%; 27% |
| Avg RAM 1 min/100,000 records | 1.7 MB; 1.7 MB | 2.5 GB; 2.5 GB |
| Number of Records | 94,199; 91,069 | 110,026; 110,794 |

The provided samples are of a larger group of samples which do not deviate and do not have outlier anomalies. It can be interpolated from the data, although the numbers are very similar, the advantages for a 250 concurrent user scenario is tending in favor of HarperDB with regards to throughput of data records written to the database. The scale of 250 concurrent user connections is representative of small websites, small IOT clusters and medium to small middleware ETL orchestrations migrating data from satellite sources to a central database server.

NMON was used to monitor each run of 250 concurrent client requests for 1 minute. NMON reported on CPU, RAM and other aspects of the operating system during the 1 minute. Each monitor report has two statistic outputs: Active RAM Usage and Average User CPU utilization.

HarperDB Advantages Over OLAP Cube

OLAP cubes store summary level data in a multidimensional format. This allows for querying information quickly using dimensions and measures. This adds enhanced performance over traditional SQL querying; however, it is limited by the information that has been defined. For example, if a user creates a cube from my Order table with number of orders as the measure, and product sku and customer country as the dimensions, then this will allow one to quickly report on:

# of orders by sku
# of orders by sku by country,
# of orders by country.
# of orders by country by sku That said if the user later wants to report on:

revenue by sku
revenue by country,
revenue by sku by country
revenue by country by sku
# of countries by product then the user would modify the OLAP cube. Or if the user wanted to report on country as a measure for example, then the client would have to duplicate data to define country as both a measure and a dimension or delete country as a dimension and define it as a measure. This is problematic, limiting and time consuming.

The other problem with this is that the data is not real time, because these measures and dimensions are still based on raw transaction data which then needs to be summarized and cubed so either this data is stale at the time of reporting or the cube attempts to refresh itself when the report is run, and this still most likely uses traditional SQL which then requires the cube to SQL query each of these dimensions and measures which is incredibly taxing. Users can end up waiting 30 or 40 minutes or more for this data to refresh.

HarperDB stores each individual attribute separately at the raw level. No counts or summaries need be stored. So, in the example above, all orders could be stored in a table level folder called <Root>/schema/production/order. Then each attribute would have its own node at a given storage level, like so:

<Root>/schema/production/order/country
<Root>/schema/production/order/sku
<Root>/schema/production/order/price
<Root>/schema/production/order/country Each node at the storage level would contain the raw data for that node. For example:

United States
China
Israel
Spain
etc. . . .

Thus, if a user wanted to run a count on the number of Orders from China, the user would go into the node called China and run a LINUX command like is -1|wc -1. This then very quickly, and in real-time, answers the question of number of orders by country with a very simple command with very low overhead without requiring all of the orders from China to be loaded into memory because each record is stored discreetly. Additionally, the user can still look at the records as raw data as well. So, unlike an OLAP cube, Country can be used in the way a cube would use a dimension or a measure with no configuration or modification required. So HarperDB is faster, more real-time, requires less overhead, and is more flexible.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A fully-indexed hierarchical database system for storing both structured and unstructured data, where the database structure rather than separate index files provides indexing, the database including:
   a server configured to receive a request from a client to read data records from a hierarchical database representing a table having rows and attributes; and
   a non-transitory, tangible computer readable storage medium, encoded with processor readable instructions for reading a data record from a table in the fully-indexed hierarchical database, wherein data records are exploded into attributes and values when written to the table, the values being child nodes of attribute nodes, and the attribute nodes being children of a table node, the fully-indexed hierarchical database including one or more table nodes, the instructions comprising:

querying the fully-indexed hierarchical database for a data record comprising an attribute and a value within a table, the querying comprising:

finding a table node corresponding to the table;

finding a hard link attribute node under the table node corresponding to the attribute;

finding a value node under the hard link attribute node corresponding to the value;

accessing a hard link node under the value node and using a hard link file therein to access a raw data file of a raw data node, wherein the raw data file is included in a raw data value node, the raw data value node being a child of a raw data attribute node, the raw data attribute node being a child of a raw data node, the raw data node being a child of the table node;

combining the raw data file and an attribute of the hard link attribute node to form the data record; and returning the data record to the client.

2. The fully-indexed hierarchical database system of claim 1, wherein a compiled version of the database is less than 100 MB in storage size.

3. The fully-indexed hierarchical database system of claim 2, wherein the compiled version of the database is less than 50 MB in storage size.

4. The fully-indexed hierarchical database system of claim 1, wherein the fully-indexed hierarchical database has a dynamic schema.

5. The system of claim 1, wherein the server is an HTTP/TCP server.

6. A method of reading a table in a fully-indexed hierarchical database for storing both structured and unstructured data, where the database structure rather than separate index files provides indexing, the method comprising:

receiving a request to read data records from a hierarchical database, at least one of the data records representing a portion of a table having a row and an attribute, wherein data records are exploded into attributes and values when written to the table, the values being child nodes of attribute nodes, and the attribute nodes being children of a table node, the fully-indexed hierarchical database including one or more table nodes, the request having conditions including a table and one or more attributes, the request including table, attribute and value conditions;

identifying a table node meeting the table condition;

identifying one or more attribute nodes meeting the attribute conditions as matching attribute nodes;

identifying one or more value nodes under each of the matching attribute nodes meeting the value conditions;

returning unique identifications associated with each of the value nodes;

accessing a hard link file in a hard link node under each of the value nodes;

launching parallel processes to read and return values for the one or more attributes, the launching comprising:

using the one or more hard link files to access corresponding raw data attribute nodes, the raw data attribute nodes being children of a raw data node that is a child of the table node;

using the unique identifiers to access raw data files of raw data nodes under the corresponding raw data attribute nodes, combining the raw data files and attributes of the hard link attribute nodes using the unique identifiers to form attribute-value pair objects; and returning the attribute-value pair objects to the client.

7. The method of claim 6, wherein the request is made via one of the following data formats: SQL, NoSQL, JSON, XML, CSV via HTTP REST API and/or command line interface.

8. The method of claim 6, wherein one of the raw data attribute nodes and one of the hard link attribute nodes corresponds to unique identifiers of the table.

9. The method of claim 6, wherein the fully-indexed hierarchical database has a dynamic schema.

10. The method of claim 6, wherein a compiled version of the database is less than 100 MB in storage size.

11. The method of claim 10, wherein the compiled version of the database is less than 50 MB in storage size.

12. The method of claim 6, wherein the server is an HTTP/TCP server.

13. A non-transitory, tangible computer readable storage medium, encoded with processor readable instructions to perform a method for creating or updating a table in a fully-indexed hierarchical database for storing both structured and unstructured data, the method comprising:

receiving a request to read data records from a hierarchical database, at least one of the data records representing a portion of a table having a row and an attribute, wherein data records are exploded into attributes and values when written to the table, the values the values being child nodes of attribute nodes, and the attribute nodes being children of a table node, the fully-indexed hierarchical database including one or more table nodes, the request having conditions including a table and one or more attributes, the request including table, attribute and value conditions;

identifying a table node meeting the table condition;

identifying one or more attribute nodes meeting the attribute conditions as matching attribute nodes;

identifying one or more value nodes under each of the matching attribute nodes meeting the value conditions;

returning unique identifications associated with each of the value nodes;

accessing a hard link file in a hard link node under each of the value nodes;

launching parallel processes to read and return values for the one or more attributes, the launching comprising:

using the one or more hard link files to access corresponding raw data attribute nodes, the raw data attribute nodes being children of a raw data node that is a child of the table node;

using the unique identifiers to access raw data files of raw data nodes under the corresponding raw data attribute nodes, combining the raw data files and attributes of the hard link attribute nodes using the unique identifiers to form attribute-value pair objects; and returning the attribute-value pair objects to the client.

14. The non-transitory, tangible computer readable storage medium of claim 13, wherein the request is made via one of the following data formats: SQL, NoSQL, JSON, XML, CSV via HTTP REST API and/or command line interface.

15. The non-transitory, tangible computer readable storage medium of claim 13, wherein one of the raw data attribute nodes and one of the hard link attribute nodes corresponds to unique identifiers of the table.

16. The non-transitory, tangible computer readable storage medium of claim 13, wherein the fully-indexed hierarchical database has a dynamic schema.

17. The non-transitory, tangible computer readable storage medium of claim 13, wherein a compiled version of the database is less than 100 MB in storage size.

18. The non-transitory, tangible computer readable storage medium of claim 17, wherein the compiled version of the database is less than 50 MB in storage size.

19. The non-transitory, tangible computer readable storage medium of claim 13, wherein the server is an HTTP/TCP server.

* * * * *